(12) United States Patent
Ohkura et al.

(10) Patent No.: US 6,728,541 B2
(45) Date of Patent: Apr. 27, 2004

(54) RADIO RELAY SYSTEM

(75) Inventors: Yoshinori Ohkura, Mito (JP); Masahiro Takahashi, Hitachi (JP); Hideaki Masuko, Hitachi (JP); Shinichi Ueda, Hitachi (JP); Takuji Hamada, Hitachiohta (JP)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 09/790,666

(22) Filed: Feb. 23, 2001

(65) Prior Publication Data

US 2001/0018328 A1 Aug. 30, 2001

(30) Foreign Application Priority Data

Feb. 29, 2000 (JP) ........................................ 2000-054959

(51) Int. Cl.[7] ................................................. H04Q 7/20
(52) U.S. Cl. ........................ 455/445; 455/15; 455/3.03; 455/419
(58) Field of Search ............................... 455/445, 403, 455/15, 419, 16, 3.03, 3.04, 3.05; 370/403, 404, 405, 419, 258

(56) References Cited

U.S. PATENT DOCUMENTS

| | | | | |
|---|---|---|---|---|
| 5,640,384 A | * | 6/1997 | Du | 370/221 |
| 5,710,756 A | * | 1/1998 | Pasternak et al. | 370/216 |
| 5,757,783 A | * | 5/1998 | Eng et al. | 370/315 |
| 6,366,584 B1 | * | 4/2002 | Gulliford et al. | 370/403 |

FOREIGN PATENT DOCUMENTS

| | | |
|---|---|---|
| JP | 11-266256 | 9/1999 |
| JP | 101585 A | 4/2000 |
| JP | 101619 A | 4/2000 |
| JP | 101620 A | 4/2000 |
| JP | 165391 A | 6/2000 |
| JP | 165408 A | 6/2000 |
| JP | 165426 A | 6/2000 |

\* cited by examiner

*Primary Examiner*—Nay Maung
*Assistant Examiner*—John J Lee
(74) *Attorney, Agent, or Firm*—Kenyon & Kenyon

(57) ABSTRACT

A plurality of radio relay stations 1 are connected so that bi-directional ring-like paths are made up of radio transmission paths. The respective radio relay stations 1 bidirectionally transmit data inputted from terminals placed thereunder onto the bidirectional ring-like paths respectively. The respective data are respectively received by radio relay stations 2 having data destination terminals placed thereunder along the bidirectional ring-like paths. Each radio relay station, which has received the data destined for the terminals placed thereunder from both directions, transmits earlier incoming data to each terminal placed thereunder and discards later incoming data.

Thus, a radio relay system can be implemented which is capable of relaying data with a high degree of reliability.

11 Claims, 28 Drawing Sheets

F I G. 7
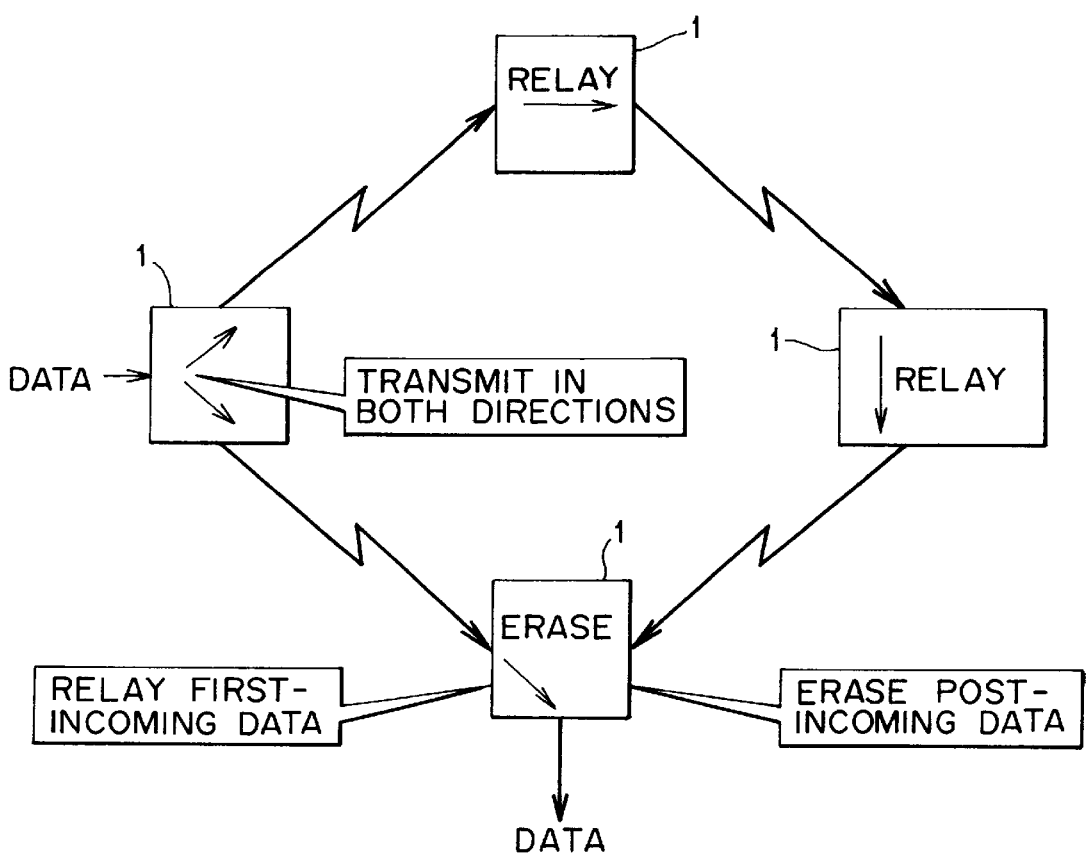

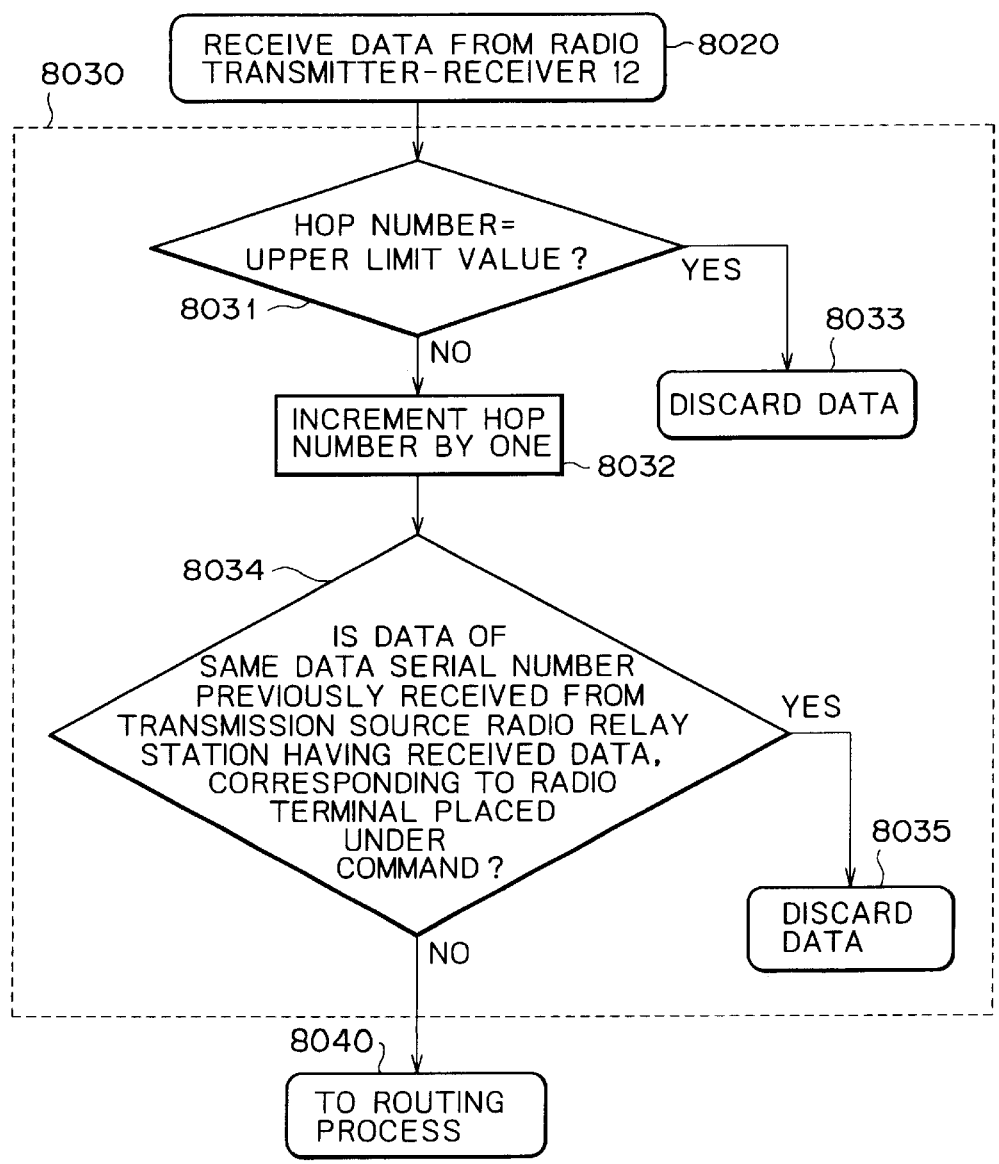
F I G. 14

FIG. 16

RELAY TABLE

| TERMINAL NUMBER (9501) | RELAY DIRECTION (9502) |
|---|---|
| 1 | RADIO RELAY PATH DIRECTION |
| 2 | RADIO RELAY PATH DIRECTION |
| 4 | RADIO RELAY PATH DIRECTION |
| 16 | WIRELESS LAN DIRECTION |
| 23 | WIRELESS LAN DIRECTION |
| ... | ... |

9500

F I G. 22
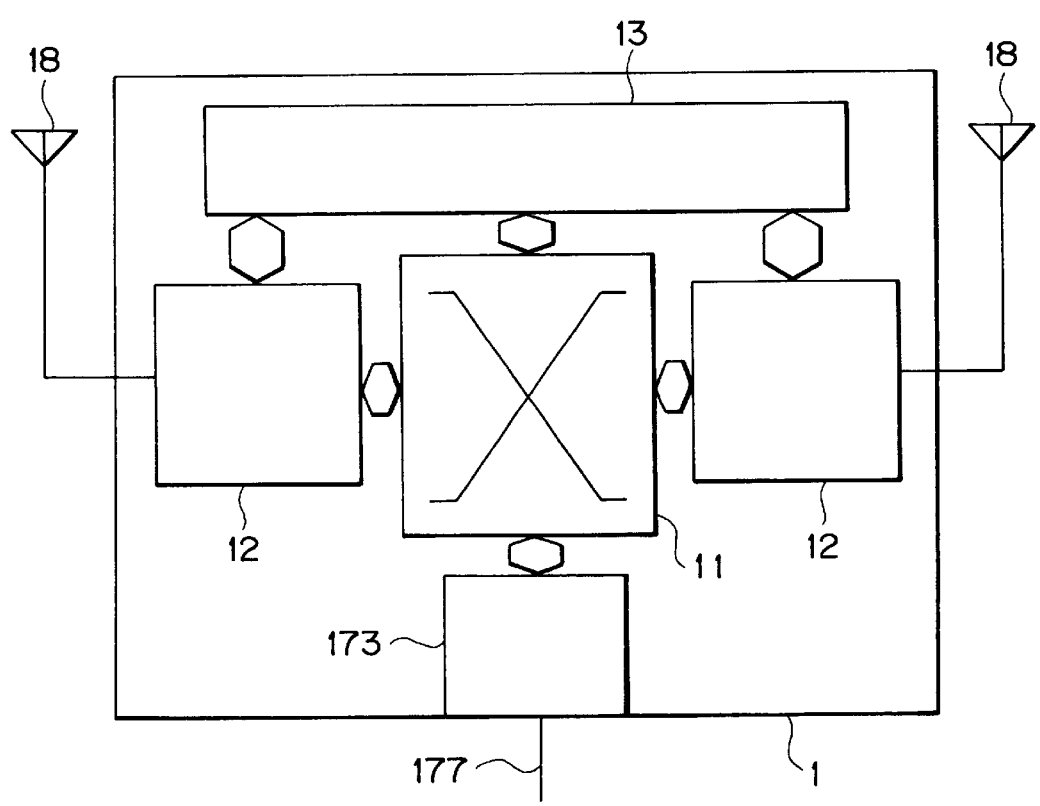

F I G. 25
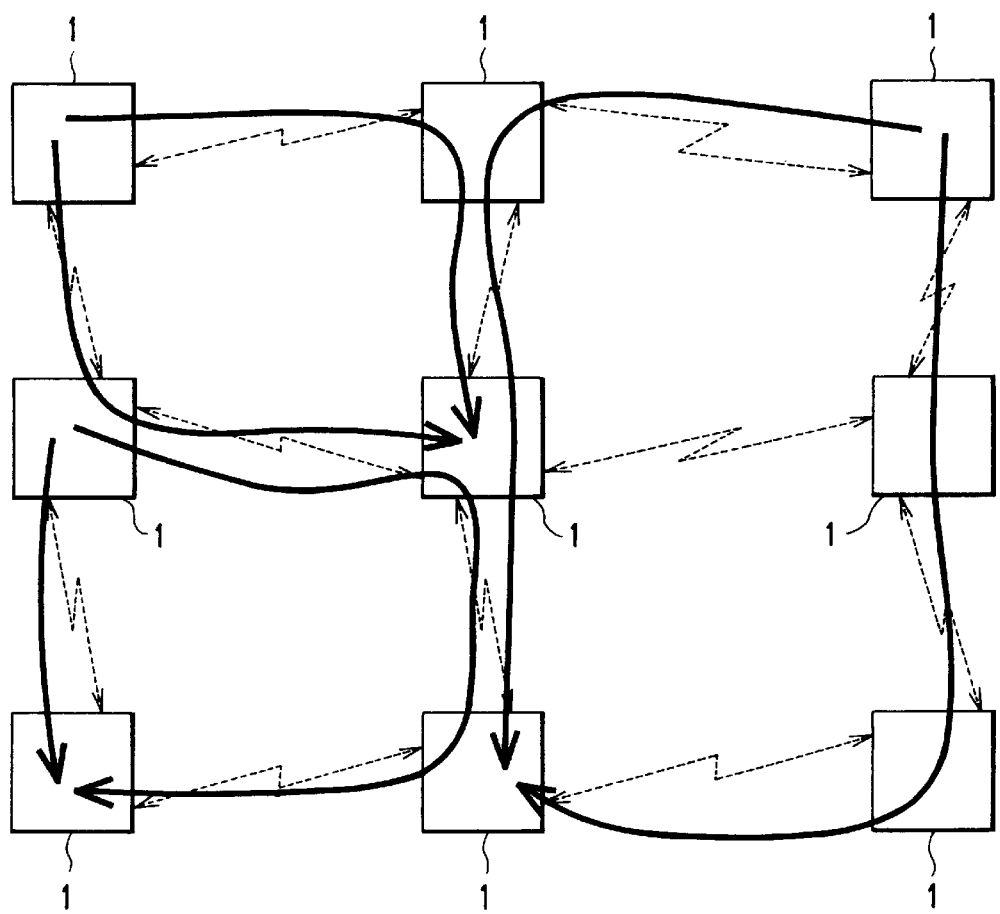

F I G. 27
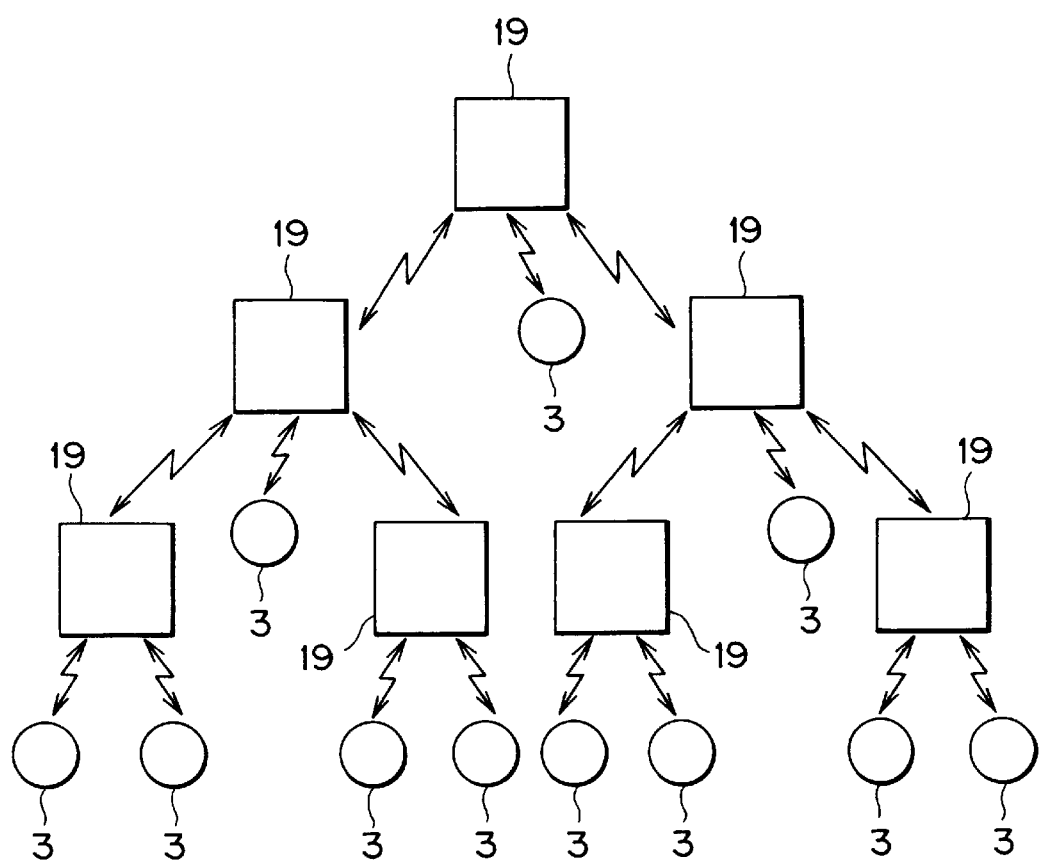

RADIO RELAY SYSTEM

BACKGROUND OF THE INVENTION

The present invention relates to a radio relay system comprising a plurality of radio relay devices for respectively relaying data by radio transmission, and particularly to a technology for improving the reliability of a radio relay system.

As a wireless or radio relay system comprising a plurality of radio relay devices for respectively relaying data by radio transmission, there has heretofore been known a radio relay system provided with a configuration shown in FIG. 27, for example.

In the illustrated radio relay system, radio relay stations 19 called "access points" respectively relay data transmitted and received by radio terminals 3 and transmit the data to their corresponding radio terminals 3 set as destinations. Data transmission paths between the respective radio relay stations 19 are configured in tree form. Each of the radio terminals 3 selects one radio relay station 19 and always transmits and receives data via the selected radio relay station 19. The respective radio relay stations 19 respectively determine the directions to be relayed from destination addresses of data transmitted from their corresponding radio terminals 3 and other radio relay stations 19, and transmit data to their corresponding radio terminals 3 and other radio relay stations 19, based on the results of determination.

SUMMARY OF THE INVENTION

However, the radio relay system having the configuration shown in FIG. 27 has a problem in that since the data transmission paths are configured in tree form, a communication interrupt is easy to occur due to radio faults such as radio interference from other radio apparatuses, radio shielding developed due to a radio barrier, wave decay developed due to water vapor, etc., equipment failures, etc.

Namely, when a radio fault occurs between given two radio relay stations 19 as shown in FIG. 28 by way of example, each radio relay station 19 lying on the branch end side as viewed from a faulty point needs to search or find a new data-transmittable radio relay station 19 on the trunk side and make a change in data relay path. Further, even when a radio relay station 19 itself is disabled due to its failure as shown in FIG. 29, radio relay stations 19 lying on the branch end sides as viewed from the faulty radio relay station 19, and a radio terminal 3 directly connected to the faulty radio relay station 19 similarly need to search new data-transmittable radio relay stations 19 on the trunk side and make a change in data relay path.

Searching a new data-transmittable radio relay station 19 on the trunk side normally needs a time interval of from a few seconds to a few minutes. Therefore, the transmission of data between the radio terminal 3 lying on the branch end side as viewed from the faulty point or faulty radio relay station 19 and each radio terminal 3 which has performed the data transmission up to now through paths passing through the faulty point or faulty radio relay station 19, is made impossible, thus disenabling communications between these radio terminals 3.

There may also be cases where when the new data-transmittable radio relay station 19 on the trunk side cannot be found out as described above upon the occurrence of the radio fault or the failure in radio relay station 19, some radio terminals 3 would lapse into such an isolated state as to be unable to communicate with other remaining radio terminals 3 as shown in FIG. 29, for example.

In the radio relay system having such a tree-shaped configuration as shown in FIG. 27, as the radio relay station comes to or approaches each radio relay station 19 lying on the further trunk side, the number of radio terminals 3, which perform communications by way of such a radio relay station 19, increases and hence a load on its relaying process becomes great. Such concentration of loads on some radio relay stations 19 will degrade the communication performance of the entire radio relay system as a bottleneck.

Thus, the present invention aims to provide a radio relay system capable of increasing reliability with respect to a failure or bottleneck in radio transmission path. Further, the present invention aims to provide a radio relay system capable of avoiding the concentration of a load on a part alone.

There is provided a radio relay system according to the present invention, for achieving the above objects, wherein a plurality of radio relay devices are ring-connected by a plurality of radio transmission paths. When communication data received from an immediately preceding radio transmission path on a ring, which is formed by the ring connection, is not destined for each communication device held by a corresponding radio relay device, each of the radio relay devices is caused to relay the communication data to an immediately following radio transmission path on the ring. On the other hand, when the communication data received from the on-ring immediately preceding radio transmission path is destined for each communication device held by the corresponding radio relay device, the radio relay device is caused to transmit the communication data to each communication device held by the corresponding radio relay device. Further, the radio relay device is caused to transmit the communication data received from each communication device held by the corresponding radio relay device to the on-ring immediately following radio transmission path.

According to such a radio relay system, the load on the relaying process of each radio relay device increases as compared with the radio relay devices on the branch end sides in the radio relay system having the aforementioned conventional tree-like configuration. Since, however, the load on a relaying process of a specific radio relay device alone is not increased in particular as in the case of the radio relay devices on the trunk side, there is no possibility that this would result in a bottleneck, thereby degrading the communication performance of the entire radio relay system.

Incidentally, in the radio relay system according to the present invention, the plurality of radio relay devices may be ring-connected in double form through the use of the plurality of radio transmission paths in such a manner that the directions of data transmission are reversely turned relative to each other. Further, each of the radio relay devices may be caused to transmit the communication data received from the communication devices held by the corresponding radio relay device to immediately following radio transmission paths on two rings formed by the double ring connection with respect to the two rings. The radio relay device may be caused to transmit only one communication data of the same communication data which are received from the on-ring immediately preceding radio transmission paths with respect to the two rings and are destined for the communication devices held by the corresponding radio relay device, to each communication device held by the corresponding radio relay device.

If done so, then communications can be continued between arbitrary two radio relay devices excluding a fault-developed radio relay device through the use of either one of the two rings even when a failure occurs in part of each ring. It is thus possible to improve reliability.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 7 is a diagram showing data relay paths employed in the radio relay system according to the first embodiment of the present invention;

FIG. 14 is a flow chart for describing a procedure of processes executed by the data relay determining device of the radio relay station according to the first embodiment of the present invention;

FIG. 16 is a diagram showing the contents of a relay table of the radio relay station according to the first embodiment of the present invention;

FIG. 22 is a block diagram illustrating a still further configurational example of the radio relay station according to the first embodiment of the present invention;

FIG. 25 is a block diagram illustrating a still further configurational example of the radio relay system according to the first embodiment of the present invention;

FIG. 27 is a block diagram showing a configuration of a conventional radio relay system related to the first embodiment of the present invention;

DESCRIPTION OF THE PREFERRED EMBODIMENTS

Preferred embodiments of the present invention will hereinafter be described in detail with reference to the accompanying drawings.

A first embodiment will first be explained.

Figure 1:
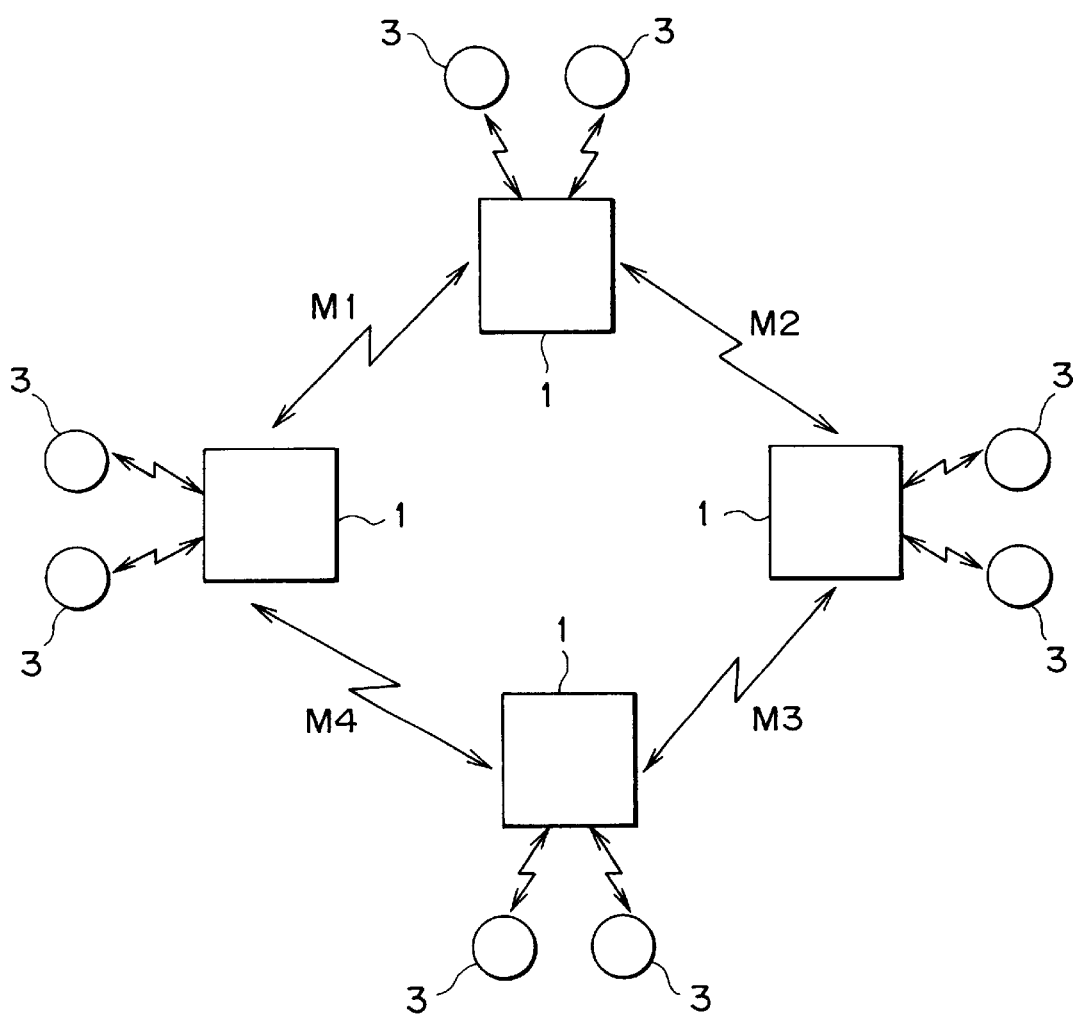
FIG. 1 is a block diagram showing a configuration of a radio relay system according to a first embodiment of the present invention.

FIG. 1 shows a configuration of a wireless or radio relay system according to the first embodiment.

As shown in the drawing, the present radio relay system has a plurality of wireless or radio relay stations 1 connected to one another by ring-shaped radio transmission paths or lines and is one wherein radio terminals 3 are held in each individual radio relay stations 1 by a wireless LAN. Namely, the present radio relay system is one wherein the respective radio relay stations 1 relay data transmitted by the radio terminals 3 to their corresponding data destination radio terminals 3 through the use of the wireless LAN and radio transmission paths M1 through M4. Incidentally, different modulating methods and frequency-based radio transmission paths are represented as M1 through M4.

Figure 2:
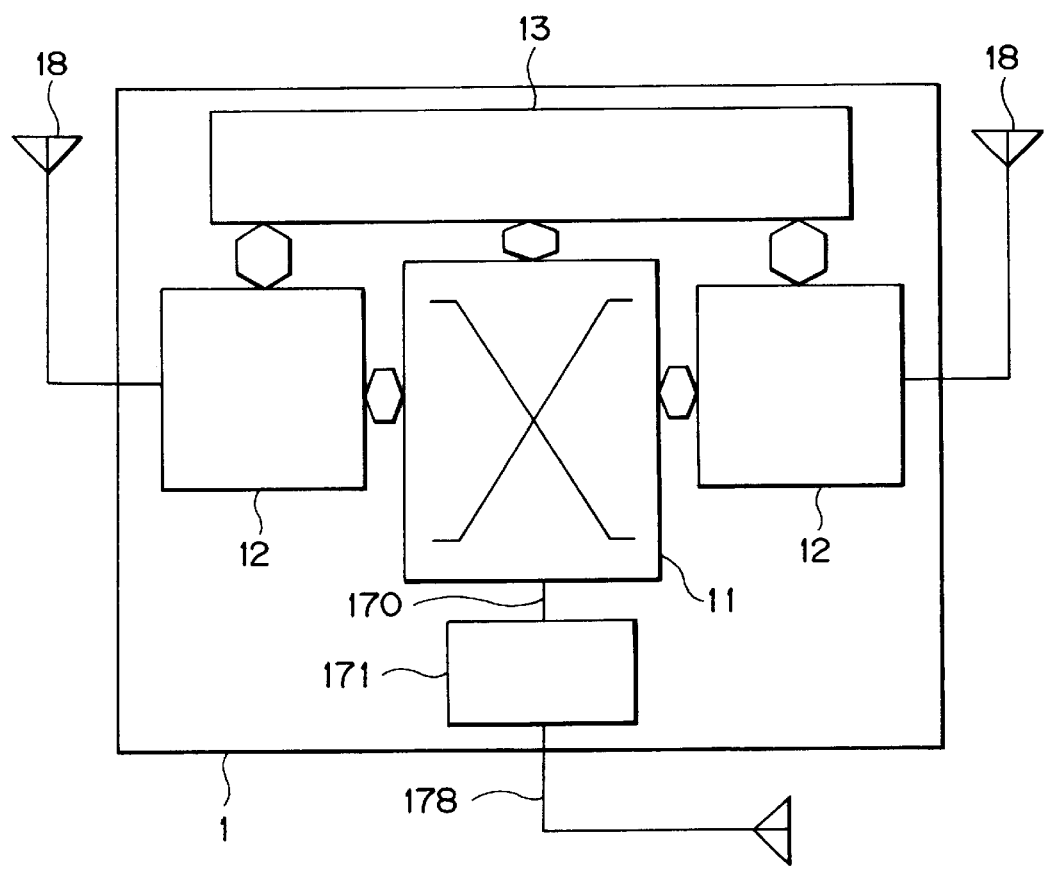
FIG. 2 is a block diagram illustrating a configuration of a radio relay station according to the first embodiment of the present invention.

A configuration of the radio relay station 1 is next shown in FIG. 2.

As shown in the drawing, the radio relay station 1 comprises two pairs of radio transmitter-receivers 12 and transmitting/receiving antennas 18, a network interface device 171 and a transmitting/receiving antenna 178 provided in a pair, a data relay determining device 11, and a transmitting/receiving method selecting device 13. Each pair of the radio transmitter-receivers 12 and transmitting/receiving antennas 18 holds a radio transmission path lying between the present radio relay station 1 and another radio relay station 1. The pair of the network interface device 171 and transmitting/receiving antenna 178 holds a wireless LAN. The data relay determining device 11 performs routing of data among three interfaces in total corresponding to the two held radio transmission paths and the wireless LAN. The transmitting/receiving method selecting device 13 selects the two held radio transmission paths.

Incidentally, as the pair of the radio transmitter-receiver 12 and transmitting/receiving antenna 18, may be used, for example, a wireless LAN card "JX-5003A" developed by Clarion Co., Ltd. and an antenna attached thereto, a wireless LAN card "ISA4800" developed by Aironet Co., Ltd. and an antenna attached thereto, etc. However, the two pairs do not necessarily require the use of the same ones as the pairs of the radio transmitter-receivers 12 and transmitting/receiving antennas 18. When a communication load on the right radio transmitter-receiver 12 is larger than that on the left radio transmitter-receiver 12 in FIG. 2, for example, the wireless LAN card "JX-5003A" having a transmission rate of 2 Mbps may be used for the left radio transmitter-receiver 12, and the wireless LAN card "ISA4800" having a transmission rate of 11 Mbps may be used for the right radio transmitter-receiver 12. As the pair of the network interface device 171 and transmitting/receiving antenna 178, may be used, for example, a wireless LAN access point "JX-5013A" developed by Clarion Co., Ltd. and an antenna attached thereto, and a wireless LAN access point "AP4800E" developed by Aironet Co., Ltd. and an antenna attached thereto. In this case, the data relay determining device 11 and the network interface device 171 are connected to one another by a 10BASE-T transmission path.

Figure 3:
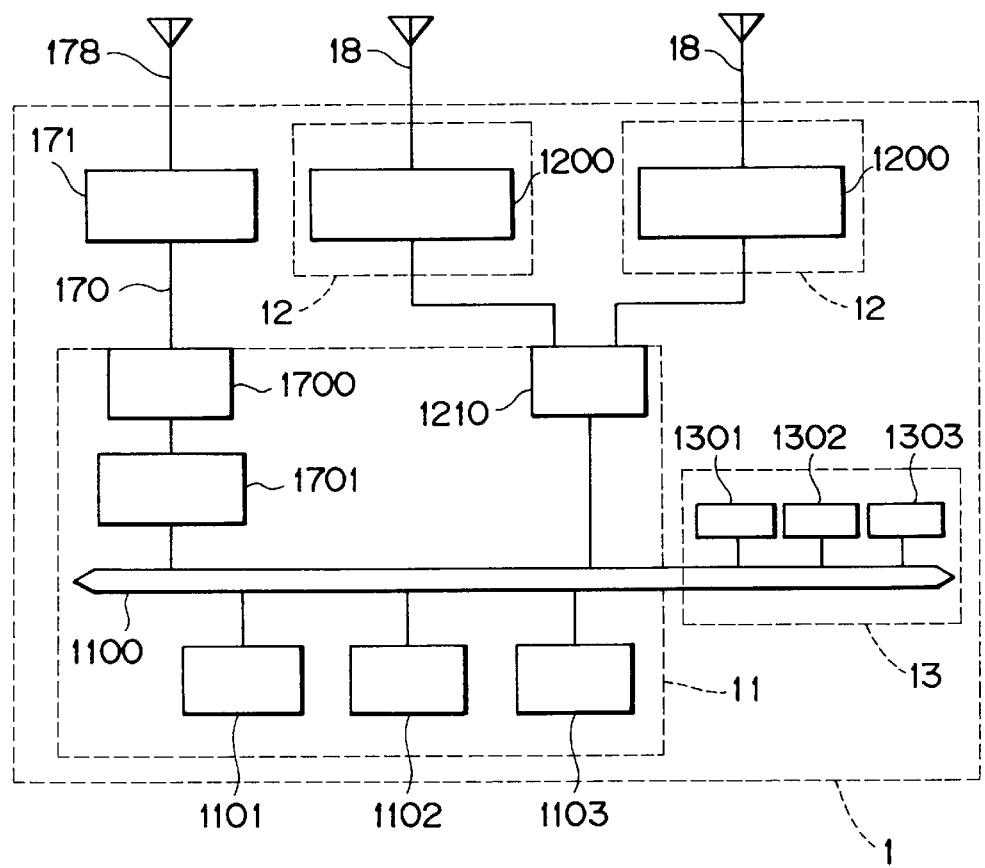
FIG. 3 is a block diagram depicting a hardware configurational example of the radio relay station according to the first embodiment of the present invention.

A specific hardware configurational example of the radio relay station 1 shown in FIG. 2 is shown in FIG. 3.

In the example shown in FIG. 3, the data relay determining device 11 takes a hardware configuration in which a CPU 1101 for performing a relay determining process, a RAM 1102 for temporarily storing transmit/receive data therein, a ROM 1103 incorporating therein a processing program for relay determination, an ISA bus controller 1210 which performs the transfer of transmit/receive data and transmit/receive control signals between the same bus controller and the radio transmitter-receivers 12, and a 10BASE-T controller 1701 and a 10BASE-T interface 1700 for transferring transmit/receive data and transmit/receive control signals to and from the network interface device 171 are connected to a system bus 1100.

The radio transmitter-receivers 12 are configured as wireless LAN cards 1200 each having an ISA bus interface, such as the wireless LAN cards "JX-5003A", "ISA4800", etc.

The transmitting/receiving method selecting device 13 has a configuration wherein a CPU 1301 for setting a transmitting/receiving method, a RAM 1302 which collects operating states of a network detected by the data relay determining device 11 and each radio transmitter-receiver 12 and stores the same therein as status information, and a ROM 1303 incorporating therein a processing program for setting the transmitting/receiving method are connected to the system bus 1100. Here, the CPU 1101, RAM 1102 and ROM 1103 may share the use of the CPU 1301, RAM 1302 and ROM 1303.

Figure 4:
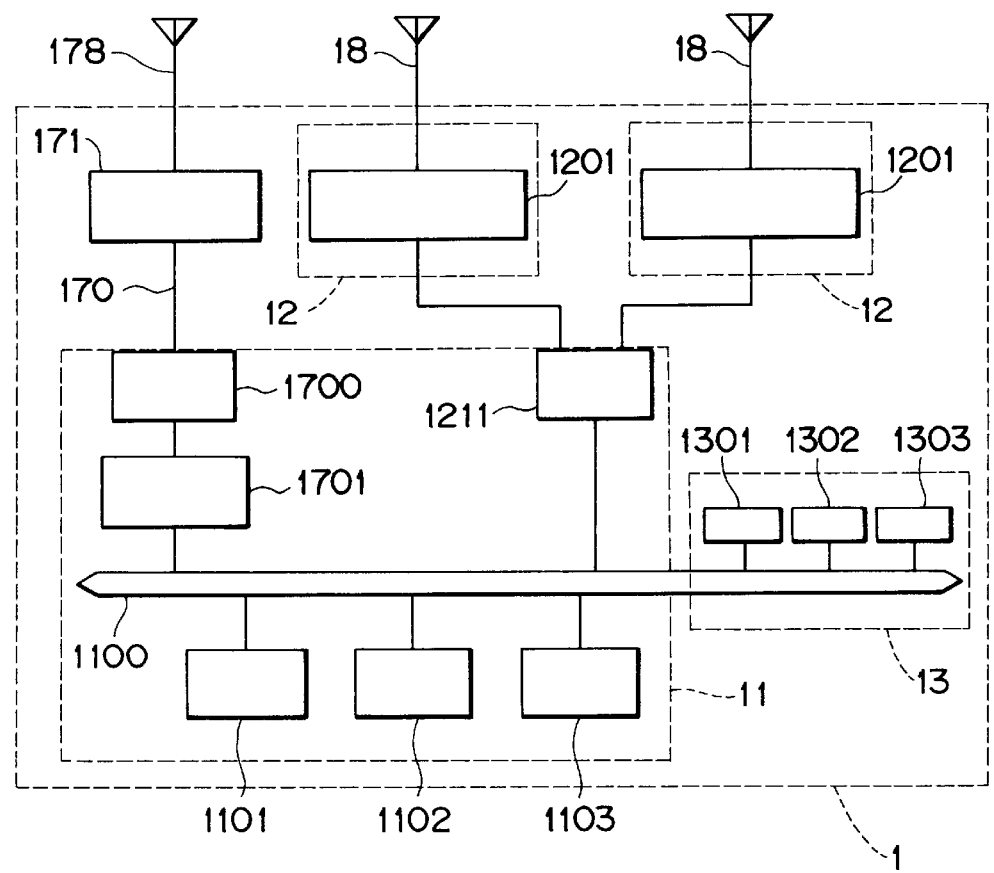
FIG. 4 is a block diagram showing another hardware configurational example of the radio relay station according to the first embodiment of the present invention.

Incidentally, a hardware configurational example wherein wireless LAN cards 1201 each having a PCMCIA interface, such as wireless LAN cards "JX-5023A", "PC4800", etc. are used as the radio transmitter-receivers 12, is taken as shown in FIG. 4. In the present configurational example, the ISA bus controller 1210 shown in FIG. 3 is replaced by a PCMCIA controller 1211, and the wireless LAN cards 1200 shown in FIG. 3 each having the ISA bus interface are respectively replaced by the wireless LAN cards 1201 each having the PCMCIA interface.

Figure 5:
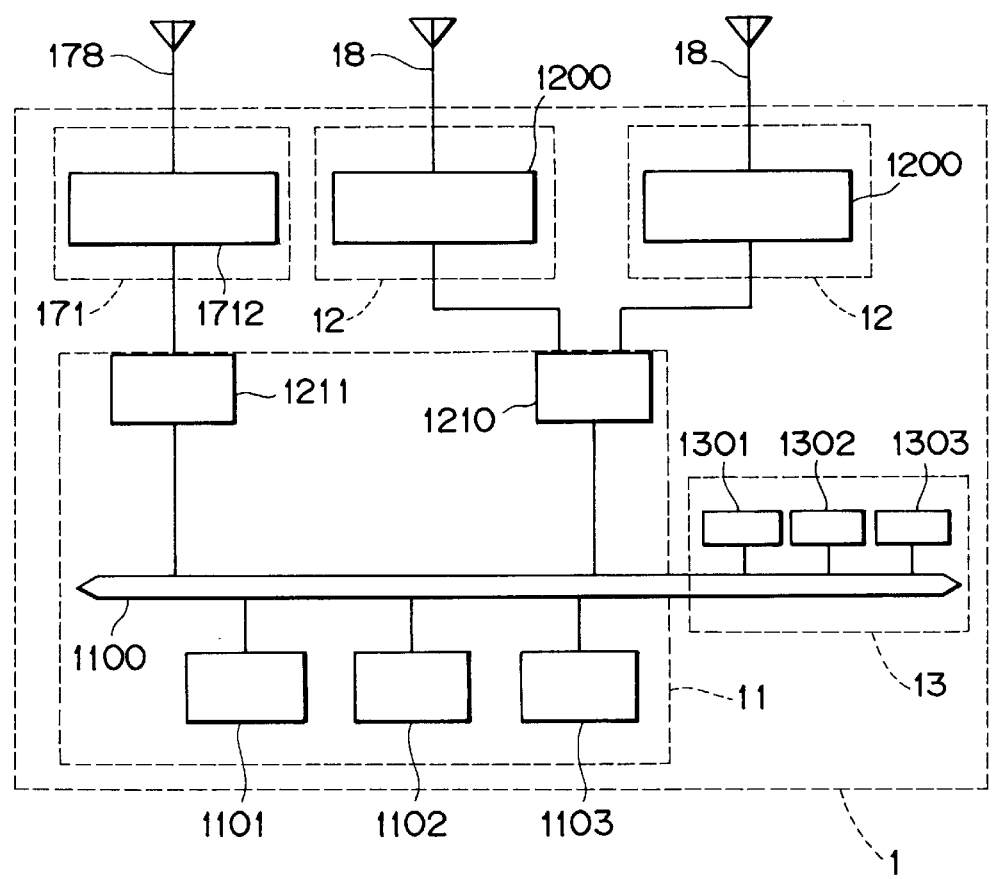
FIG. 5 is a block diagram illustrating a further hardware configurational example of the radio relay station according to the first embodiment of the present invention.

A hardware configurational example wherein a wireless LAN card 1712 (e.g., "PC4800") is used as the network interface device 171, is taken as shown in FIG. 5. In the present configurational example, the 10BASE-T interface 1700 and 10BASE-T controller 1701 shown in FIG. 3 are replaced by a PCMCIA controller 1211.

Incidentally, a configuration in which the 10BASE-T interface 1700 and 10BASE-T controller 1701 shown in FIG. 4 are replaced by the PCMCIA controller 1211 and the wireless LAN card 1712 (e.g., "PC4800") is used as the network interface device 171, etc. are considered in addition to the above. However, they are all merely different in interface of a radio hardware portion. Basic functions such as relay functions included in the radio relay stations 1 are all the same.

The operation of such a radio relay station 1 will be described below.

First of all, the respective radio relay stations 1 respectively determine adjacent radio relay stations 1 for transmitting and receiving data, according to a predetermined connection configuration of radio transmission paths which connect the respective radio relay stations 1 in ring form.

Next, the transmitting/receiving method selecting device 13 of each radio relay station 1 determines transmit parameters such as a modulating method, a frequency, a transmit/receive identifier, etc. used when data is transmitted to each adjacent radio relay station 1, and sets them to the data relay determining device 11 and the radio transmitter-receivers 12. Then the corresponding radio relay station 1 per se notifies transmit parameters used for the transmission of data to each adjacent radio relay station 1 to each of two adjacent radio relay stations 1 adjacent to the corresponding radio relay station 1, whereby a radio transmission path for connecting the corresponding radio relay station 1 and each adjacent radio relay station 1 is formed. This processing is carried out by the transmitting/receiving method selecting devices 13 of all the radio relay stations 1, whereby a data transmission path for connecting the respective radio relay stations 1 in ring form is formed. If, at this time, the radio transmission path for coupling the adjacent two radio relay stations 1 to each other is capable of two-way communication, then data transmission paths for connecting the respective radio relay stations 1 result in a bidirectionally-communicable ring transmission path. This is logically equivalent to the formation of the ring-like transmission path in double form. In the following description, the bidirectionally-communicable ring transmission path will be regarded as the ring-shaped transmission path formed in double form.

When the same modulating method or scheme and frequency are set by all the radio relay stations 1, radio interference is developed between the radio relay stations. Thus, for example, the disappearance of data occurs, and the number of relay data per unit time is reduced, thereby causing a reduction in relay performance. Therefore, ones as different as possible are set as the modulating method and frequency for each pair of the mutually adjacent radio relay stations 1. When a frequency hopping mode is used for the modulating scheme, for example, hopping patterns different from each other between the left radio transmitter-receiver 12 and the right radio transmitter-receiver 12 are set in FIG. 2 to prevent mutual interference. When a direct diffusing mode is used for the modulating scheme, frequencies and diffusion codes different from one another between the left radio transmitter-receiver 12 and the right radio transmitter-receiver 12 are set to prevent mutual interference.

Incidentally, when it is not possible to prevent the mutual interference even in the case of the above settings, a directional antenna is used or a radio wave or light lying in a high-frequency band, which has a strong direct-advance characteristic, is used. In this condition, data is transmitted so as to be capable of being received only by the corresponding transmitting/receiving antenna 18 of the radio relay station 1 to receive it, whereby the radio mutual interference developed between the radio relay stations can be prevented.

Incidentally, the determination of the transmit parameter by the transmitting/receiving method selecting device 13 of each radio relay station 1 may depend on the acceptance of settings from an operator, for example. In this case, the transmitting/receiving method selecting device 13 may issue a warning and encourage a change to prevent the setting of the same modulating method and frequency by the left radio transmitter-receiver 12 and the right radio transmitter-receiver 12 in FIG. 2 when the same modulating method and frequency are set by the operator.

Further, the determination of the transmit parameters by the transmitting/receiving method selecting device 13 of each radio relay station 1 may autonomously be carried out according to the following processing.

Figure 6:
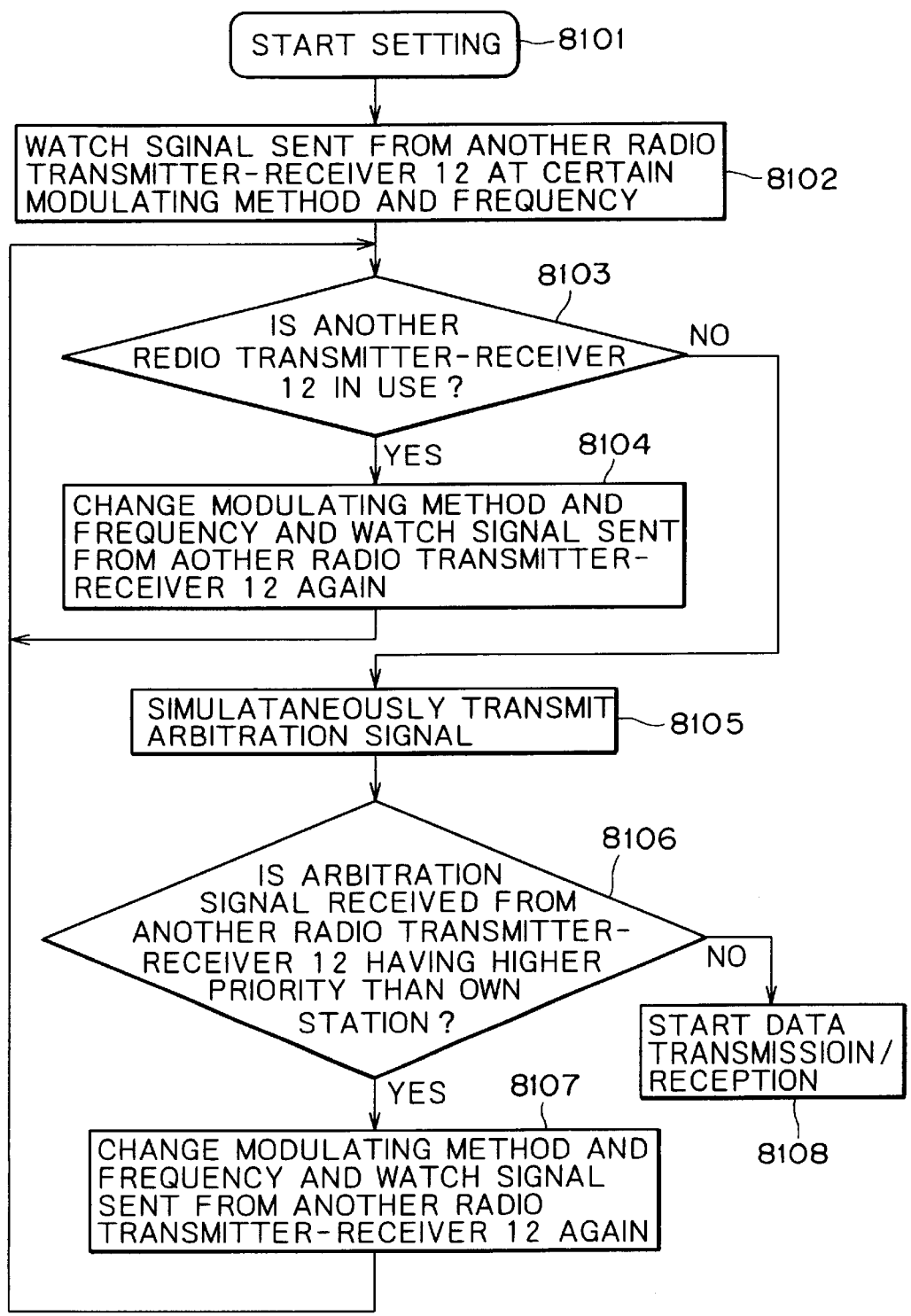
FIG. 6 is a flow chart for describing a procedure of processes executed by a transmitting/receiving method selecting device employed in the radio relay station according to the first embodiment of the present invention.
Figure 8:
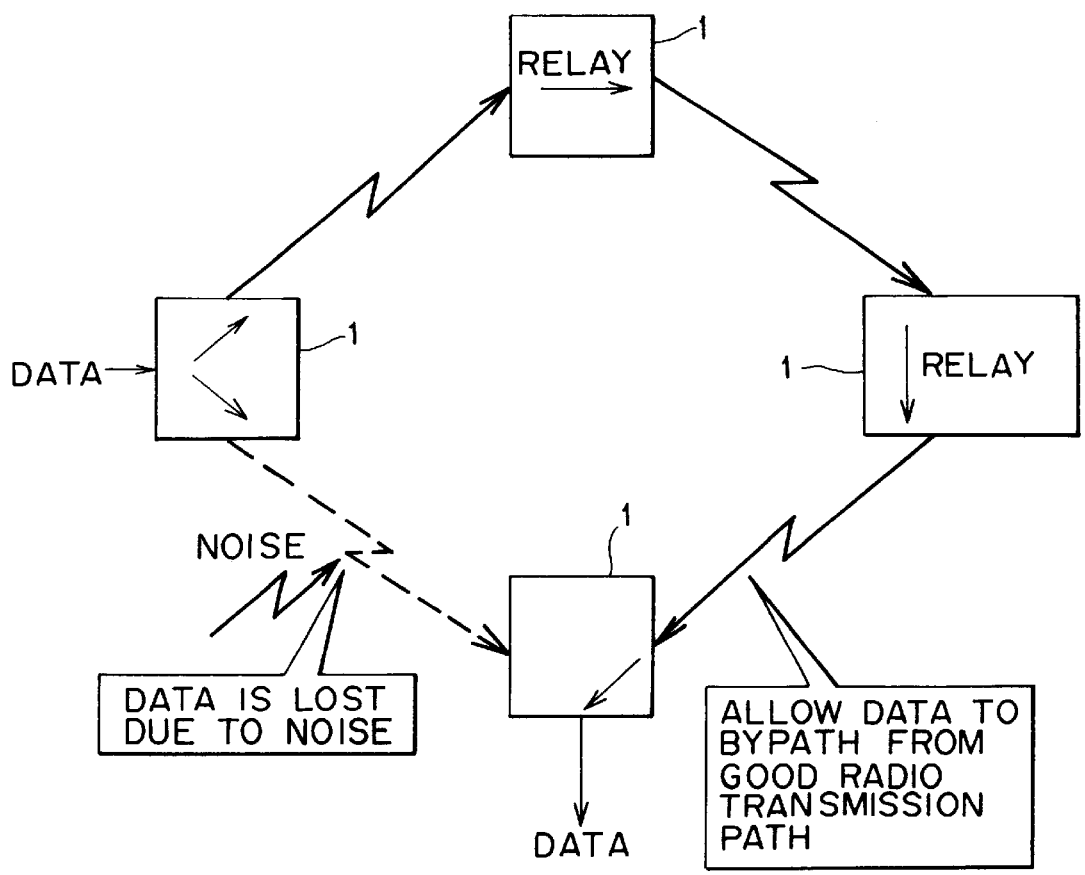
FIG. 8 is a diagram illustrating data relay paths employed in the radio relay system according to the first embodiment of the present invention.

Namely, as shown in FIG. 6, the transmitting/receiving method selecting device 13 of each radio relay station 1 suitably determines a modulating method and a frequency for each radio transmitter-receiver 12 included in its own radio relay station 1 (procedural step 8101). Further, the transmitting/receiving method selecting device 13 watches a signal sent from a radio transmitter-receiver 12 of another radio relay station 1, based on the modulating method and frequency (procedural step 8102). If the radio transmitter-receiver 12 of another radio relay station 1 is in use (procedural step 8103), then the transmitting/receiving method selecting device 13 changes the above to another modulating method and frequency and watches a signal sent from the radio transmitter-receiver 12 of another radio relay station 1 (procedural step 8104). If the radio transmitter-receiver 12 of another radio relay station 1 is not in use (procedural step 8103), then the transmitting/receiving method selecting device 13 simultaneously transmits an arbitration signal indicative of the priority of each radio transmitter-receiver 12 of its own radio relay station 1 (procedural step 8105).

If the arbitration signal using the same modulating method and frequency is received from the radio transmitter-receiver 12 of another radio relay station 1 (procedural step 8106), then the modulating method and frequency of the radio transmitter-receiver of its own radio relay station 1 are changed to another modulating method and frequency if the radio transmitter-receiver 12 of another radio relay station 1 has higher priority than the radio transmitter-receiver 12 of its own radio relay station 1. Further, the transmitting/receiving method selecting device 13 watches a signal sent from the radio transmitter-receiver 12 of another radio relay station 1 again (procedural step 8107) and returns to the procedural step 8103.

When the arbitration signal using the same modulating method and frequency is not received from the radio transmitter-receiver 12 of another radio relay station 1 or when the priority of the radio transmitter-receiver 12 of another radio relay station 1 having received the arbitration signal using the same modulating method and frequency is lower than that of the radio transmitter-receiver 12 of its own radio relay station 1, the modulating method and frequency are determined as transmit parameters. Through the use of the format of transmission data and predetermined negotiation to be described later, the transmitting/receiving method selecting device 13 notifies the transmit parameters to each adjacent radio relay station 1 which forms a radio transmission path between the same adjacent radio relay station 1 and its own radio relay station 1 by using the transmit parameters. Thus, the radio transmission path based on the transmit parameters is formed between its own radio relay station 1 and the adjacent radio relay station 1. Then the transmitting/receiving method selecting device 13 starts the transmission of data to the radio transmitter-receiver 12 of the above radio relay station 1 through the use of this radio transmission path (procedural step 8108).

Incidentally, numbers (e.g., MAC (Media Access Control) addresses) peculiar to each individual radio transmitter-receivers 12 can be used for the priorities of the radio transmitter-receivers 12.

Thus, if a data transmission path set in ring form are configured in double form so that respective radio transmission paths forming the data transmission path do not interfere with each other, the radio relay station 1 having produced data to be relayed transmits the same data in both directions of the data transmission path set in ring form as shown in FIG. 7. The respective data are relayed to the corresponding radio relay station 1 holding a data destination radio terminal 3 through a wireless LAN so as to reversely circulate over the ring-like data transmission path.

The radio relay station 1 having hold the data destination radio terminal 3 through the wireless LAN relays the first-incoming data of the data received from both directions of the ring-shaped transmission path to a destination radio terminal 4 and deletes the post-incoming data. This is done to prevent the destination radio terminal 3 from receiving the same data in double form.

Even when a data-relay incapable radio transmission path occurs in the data transmission path circulated in one direction between given two radio relay stations 1 due to wave interference such as noise, or a failure in radio relay station, etc. as a result of the execution of such a relay by each individual radio relay stations 1, the data is relayed by the data transmission path circulated in the reverse direction without via such troubled radio transmission path. Consequently, the data which arrives through such a reversely-circulated data transmission path, is firstly destined for the radio relay station 1 ahead of the faulty point as viewed in the one circulated-direction from the data transmission-source radio relay station 1. Accordingly, no data disappearance and communication interrupt occur. Therefore, a change in data transmission path and a communication interruption and data disappearance due to isolation or the like are avoided.

Figure 9:
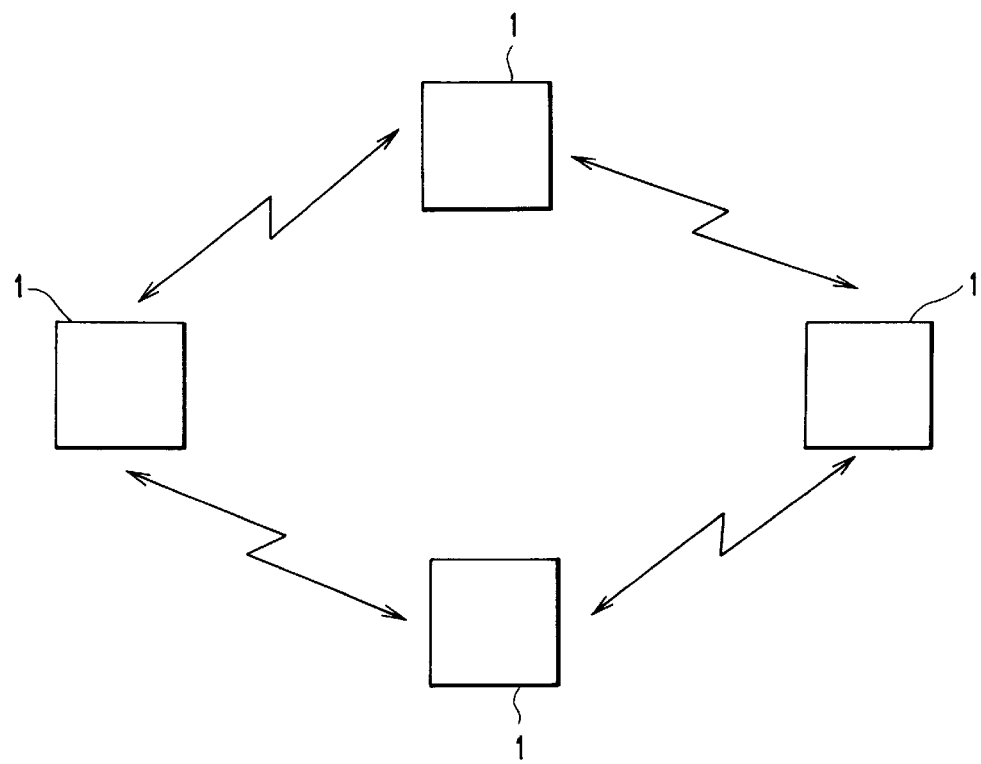
FIG. 9 is a diagram depicting a ring-like transmission path employed in the radio relay system according to the first embodiment of the present invention.
Figure 10:
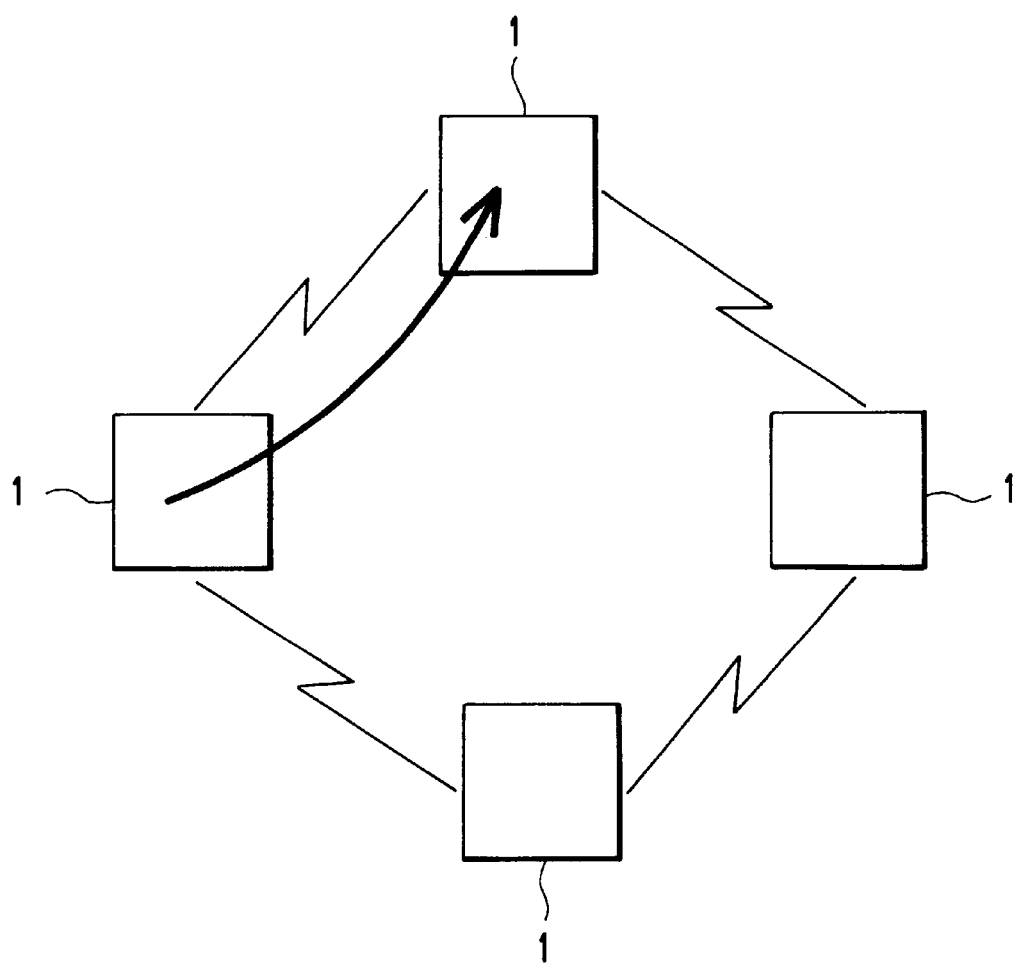
FIG. 10 is a diagram showing a path effective between radio terminals employed in the radio relay system according to the first embodiment of the present invention upon non-occurrence of a failure.
Figure 11:
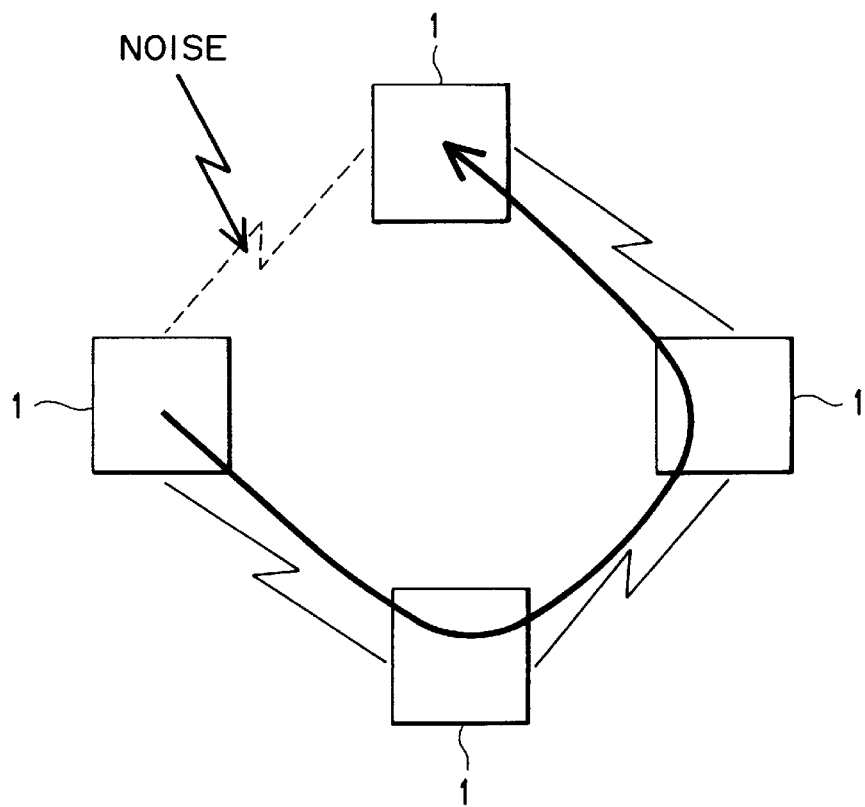
FIG. 11 is a diagram illustrating a path effective between radio terminals employed in the radio relay system according to the first embodiment of the present invention upon non-occurrence of a failure.

Incidentally, if viewed as an effective path between two radio terminals 3, this becomes equivalent to a case in which where a partial radio transmission path is temporarily or permanently unavailable due to noise or the like when data is normally relayed through such a path as shown in FIG. 10 in a radio relay system having such a ring-shaped and bidirectional data transmission path as shown in FIG. 9, such another path as shown in FIG. 11 is set to continue data transmission.

The details of the operation of such a radio relay station 1 will be described below.

Figure 12:
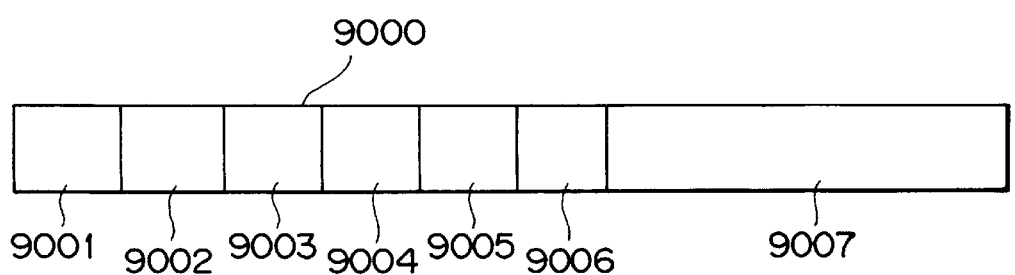
FIG. 12 is a diagram depicting a format of data transmitted through the radio relay system according to the first embodiment of the present invention.

A format of data transmitted from the radio transmitter-receiver 12 by the radio relay station 1 is first shown in FIG. 12.

In the drawing, reference numeral 9001 indicates a hop number, which is a number indicative of the number of radio relay stations 1 by which transmission data 900 is subjected to relay processing. Reference numeral 9002 indicates a transmission source radio relay station number, which is a number indicative of the radio relay station 1 which receives the transmission data 9000 through the network interface device 171 and transmits it from the corresponding radio transmitter-receiver 12. Reference numeral 9003 indicates a data serial number, which represents a serial number attached to the data received via the network interface device 171 by the radio relay station 1 represented by the transmission source radio relay station number 9002 and transmitted through the radio transmitter-receiver 12 by the radio relay station 1. Reference numeral 9004 indicates a transmission source terminal number, which is a number indicative of a radio terminal 3 to which the transmission data 9000 is transmitted. Reference numeral 9005 indicates a destination terminal number, which is a number indicative of a radio terminal 3 used to receive the transmission data 9000. Reference numeral 9007 indicates an information portion, which stores information to be transmitted to the radio terminal 3 indicated by the destination terminal number 9005 from the radio terminal 3 indicated by the transmission source terminal number 9004. Reference numeral 9006 indicates a transmit/receive identifier, which is an inherent identifier fixed between the radio transmitter-receivers 12 of each individual adjacent radio relay stations 1 which directly transmit and receive data. The transmit/receive identifier 9006 is determined between the radio transmitter-receivers 12 of the adjacent radio relay stations 1 which directly transmit and receive the data, to prevent the mixing of data transmitted from the radio relay stations 1 other than the adjacent radio relay station 1 when relay data is transmitted and received between the adjacent radio relay stations 1. If transmit/receive identifiers 9006 different from each other between the left radio transmitter-receiver 12 and the right radio transmitter-receiver 12 are set in FIG. 2, for example, then the data transmitted from the left radio transmitter-receiver 12 can be prevented from being accidentally received by the right radio transmitter-receiver 12. Incidentally, an identifier called an "ESSID" corresponds to the transmit/receive identifier 9006 in the aforementioned wireless LAN cards or the like.

The details of operations of the respective parts in the radio relay station 1 will next be explained.

One of the radio transmitter-receivers 12 demodulates a radio wave signal received by its corresponding transmitting/receiving antenna 18 and converts it to digital data of relay processable "1" and "0".

The data relay determining device 11 determines based on a destination terminal number 9005 of the data demodulated by the radio transmitter-receiver 12, whether the data is data to be relayed to another radio relay station 1 or data to be relayed to the wireless LAN, or data to be discarded.

If the data is found to be the data to be relayed to another radio relay station 1, then the data relay determining device 11 issues a command for the transmission of the data to the radio transmitter-receiver 12 having demodulated the data and the other radio transmitter-receiver 12. In response to the command, the other radio transmitter-receiver 12 modulates the data to be relayed as instructed from the data relay determining device 11 and converts it to a radio wave signal, followed by transmission through the transmitting/receiving antenna 18.

If the data is found to be the data to be relayed to the wireless LAN, then the data relay determining device 11 instructs the network interface device 171 to transmit the data. In response to it, the network interface device 171 transmits the data to be relayed as instructed by the data relay determining device 11.

If the data is found to be the data to be discarded, then the data relay determining device 11 discards it and does not relay it.

The network interface device 171 sends data received from the radio terminal 3 held in itself to the data relay determining device 11. In response to it, the data relay determining device 11 is operated in the same manner as described above.

Figure 13:
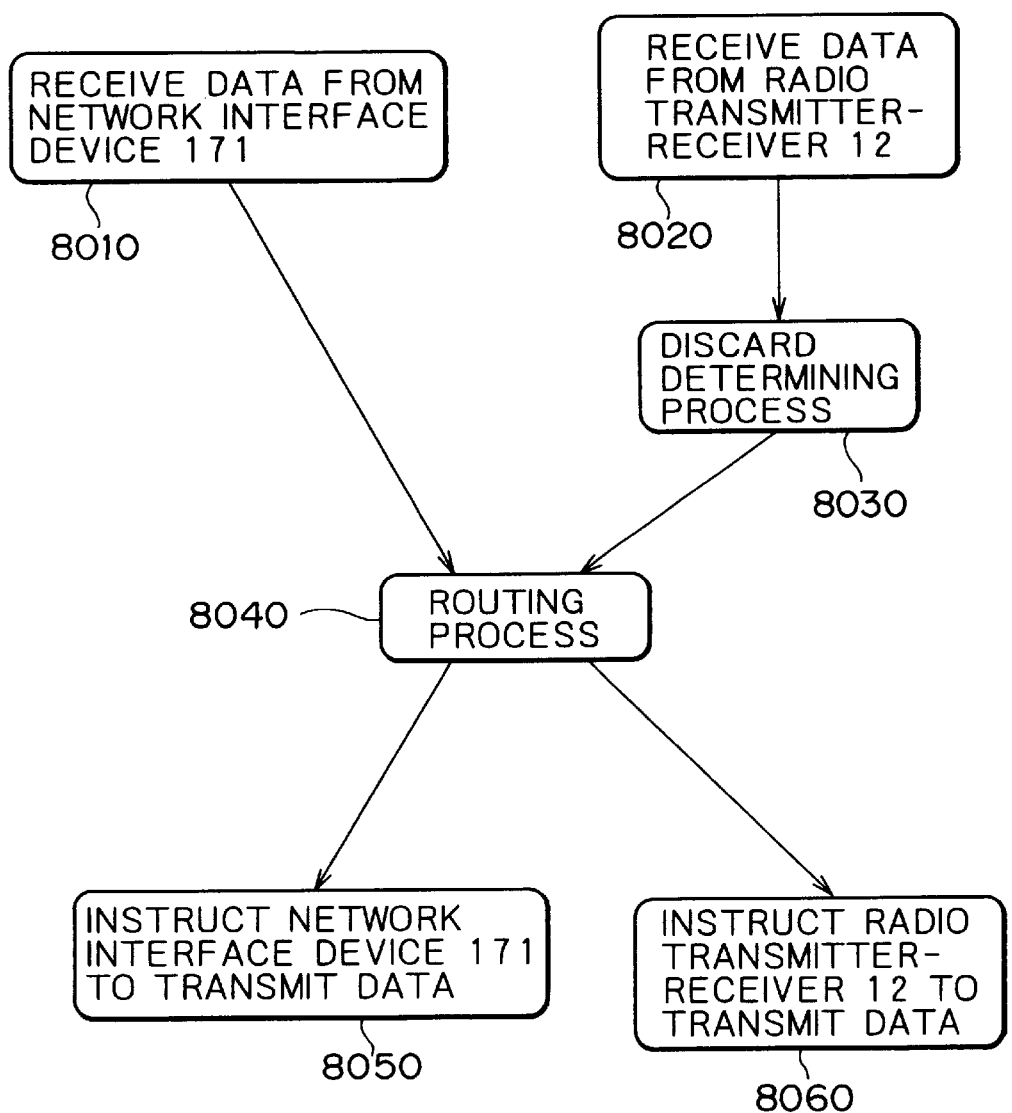
FIG. 13 is a flow chart for describing a procedure of processes executed by a data relay determining device of the radio relay station according to the first embodiment of the present invention.

FIG. 13 shows a summary of relay processing executed by the data relay determining device 11.

When the data relay determining device 11 receives data from the wireless LAN through the network interface device 171 (procedural step 8010), the data relay determining device 11 effects a routing process on the data (procedural step 8040) and determines whether the data should be relayed. Further, the data relay determining device 11 transmits the data to the wireless LAN again (procedural step 8050) according to the above decision, or transmits it to each individual adjacent radio relay stations 1 through both the radio transmitter-receivers 12 (procedural step 8060).

When the data relay determining device 11 receives data from each adjacent radio relay station 1 through either one of the radio transmitter-receivers 12 (procedural step 8020), the data relay determining device 11 makes a decision as to whether the corresponding data should be discarded or relayed according to a discard determining process (procedural step 8030). When the data is judged to be relayed, the data relay determining device 11 executes the routing process (procedural step 8040) and determines the direction to relay the data. According to the determined direction, the data relay determining device 11 transmits the data to each adjacent radio relay station 1 through the radio transmitter-receiver 12 different from the radio transmitter-receiver device 12 having received the data therein (procedural step 8060) or transmits it to the wireless LAN through the network interface device 171 (procedural step 8050).

In the discard determining process (procedural step 8030) shown in FIG. 13, it is determined as shown in FIG. 14 whether the hop number 9001 described in the transmission data 9000 is equal to a predetermined upper limit value (procedural step 8031). If the hop number is judged to be equal thereto, then it is discarded (procedural step 8033). This is because the transmission data 9000 is to be received from the terminal indicated by the destination terminal number 9005 but might infinitely orbit within the ring-like radio relay system without the normal reception thereof when some failure occurs. In order to prevent such infinite orbiting, the hop number 9001 is incremented by one each time the transmission data 9000 passes through the corresponding radio relay station 1 (procedural step 8032). When the hop number 9001 becomes equal to the predetermined upper limit value as described above, some kind of failure is judged to have occurred and hence the transmission data 9000 is discarded. Incidentally, when the hop number 9001 is decremented by one each time the transmission data 9000 passes through the radio relay station 1, and it becomes equal to a predetermined lower limit value, the transmission data 9000 may be discarded.

It is next examined whether the destination terminal number 9005 of the transmission data 9000 indicates a radio terminal 3 held in a wireless LAN to which the corresponding radio relay station itself is connected, and the transmission source radio relay station number 9002 and data serial number 9003 described within the transmission data 9000 coincide with those received in the past (procedural step 8034). If judged so, then the transmission data 9000 received this time is discarded (procedural step 8035). This is because the reception of data of the same data serial number in the past, of data relayed from the same transmission source radio relay stations 1 results in the double reception of data received this time, and if it is relayed, then the same data is double-received at the destination radio terminal 3, thus causing a possibility that failures will occur in the operation of the destination radio terminal 3.

When the destination terminal number 9005 of the transmission data 9000 does not indicates the radio terminal 3 held in the wireless LAN to which the corresponding radio relay station itself is connected, or the transmission source radio relay station number 9002 and data serial number 9003 described within the transmission data 9000 do not coincide with those received in the past, data is delivered to the routing process (procedural step 8040).

However, the above discard determining process (procedural step 8030) may be modified so as to discard data regardless of the data destination terminal number 9005 where the transmission source radio relay station number 9002 and data serial number 9003 described within the transmission data 9000 coincide with those received in the past.

Figure 15:
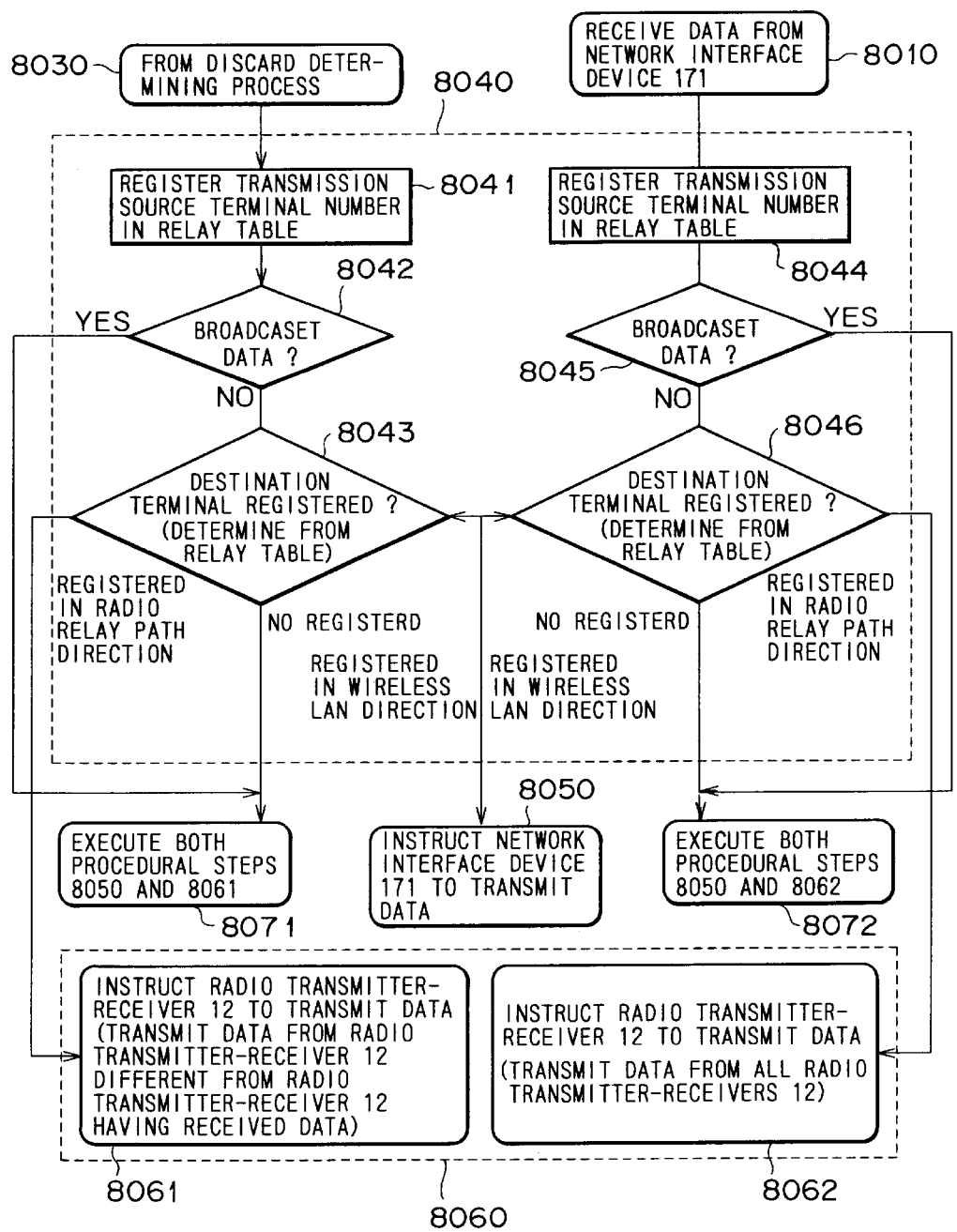
FIG. 15 is a flow chart for describing a procedure of processes executed by the data relay determining device of the radio relay station according to the first embodiment of the present invention.

In the routing process (procedural step 8040), transmission source terminal numbers 9004 described within transmission data 9000 delivered from the discard determining process (procedural step 8030) as shown in FIG. 15 are registered in a relay table 9500 shown in FIG. 16 with relay directions of data destined for the transmission source terminals as radio relay paths (procedural step 8041). If broadcast data is given (procedural step 8042), then a command for transmitting the data is issued to the radio transmitter-receiver 12 different from the radio transmitter-receiver 12 having received the corresponding data therein, and the network interface device 171 (procedural step 8071).

On the other hand, when the broadcast data is not given (procedural step 8042), the corresponding destination terminal number 9005 described within the transmission data 9000 is retrieved from the relay table 9500 shown in FIG. 16 (procedural 8043). If its relay direction is found to have been registered therein as a wireless LAN direction, then a command for transmitting its data is issued to the network interface device 171 (procedural step 8050). On the other hand, if the relay direction thereof is found to have been registered therein as a radio relay path, then a command for transmitting the data is issued to a radio transmitter-receiver 12 corresponding to a radio transmission path, which has no received the data therein (procedural step 8601).

If the destination terminal number 9005 is found not to be registered in the relay table 9500, then a command for transmitting data about it is issued to the radio transmitter-receiver 12 corresponding to the radio transmission path not equivalent to the radio transmission path having received the data, and the network interface device 171 (procedural step 8701).

On the other hand, each transmission source terminal number 9004 described within the transmission data 9000 received by the network interface device 171 (procedural step 8030) is registered in the relay table 9500 shown in FIG. 16 with each relay direction of data destined for its transmission source terminal as a wireless LAN (procedural step 8044). If the data is given as broadcast data (procedural step 8045), then a command for transmitting the data is issued to the network interface device 171 and all the radio transmitter-receivers 12 (procedural step 8072).

On the other hand, if the data is not found to be given as the broadcast data (procedural step 8045), then the corresponding destination terminal number 9005 described within the transmission data 9000 is retrieved from the relay table 9500 shown in FIG. 16 (procedural step 8046). If the relay direction thereof has been registered as the wireless LAN, then a command for transmitting its data is issued to the network interface device 171 (procedural step 8050). On the other hand, if the relay direction thereof has been registered as the radio relay path, then a command for transmitting its data is issued to all the radio transmitter-receivers 12 (procedural step 8062).

If the destination terminal number 9005 is found not to be registered in the relay table 9500, then a command for transmitting its data is issued to the network interface device 171 and all the radio transmitter-receivers 12 (procedural step 8072).

Incidentally, the relay table 9500 is a table for registering terminal numbers 9501 and their relay directions 9502 as shown in FIG. 16.

The first embodiment of the present invention has been described above.

In the above-described embodiment, however, the transmitting/receiving method selecting device 13 of each radio relay station 1 may monitor the state of communications of each radio relay path and change the setting of a transmitting/receiving method to continue communications when the state of communications is degraded.

Figure 17:
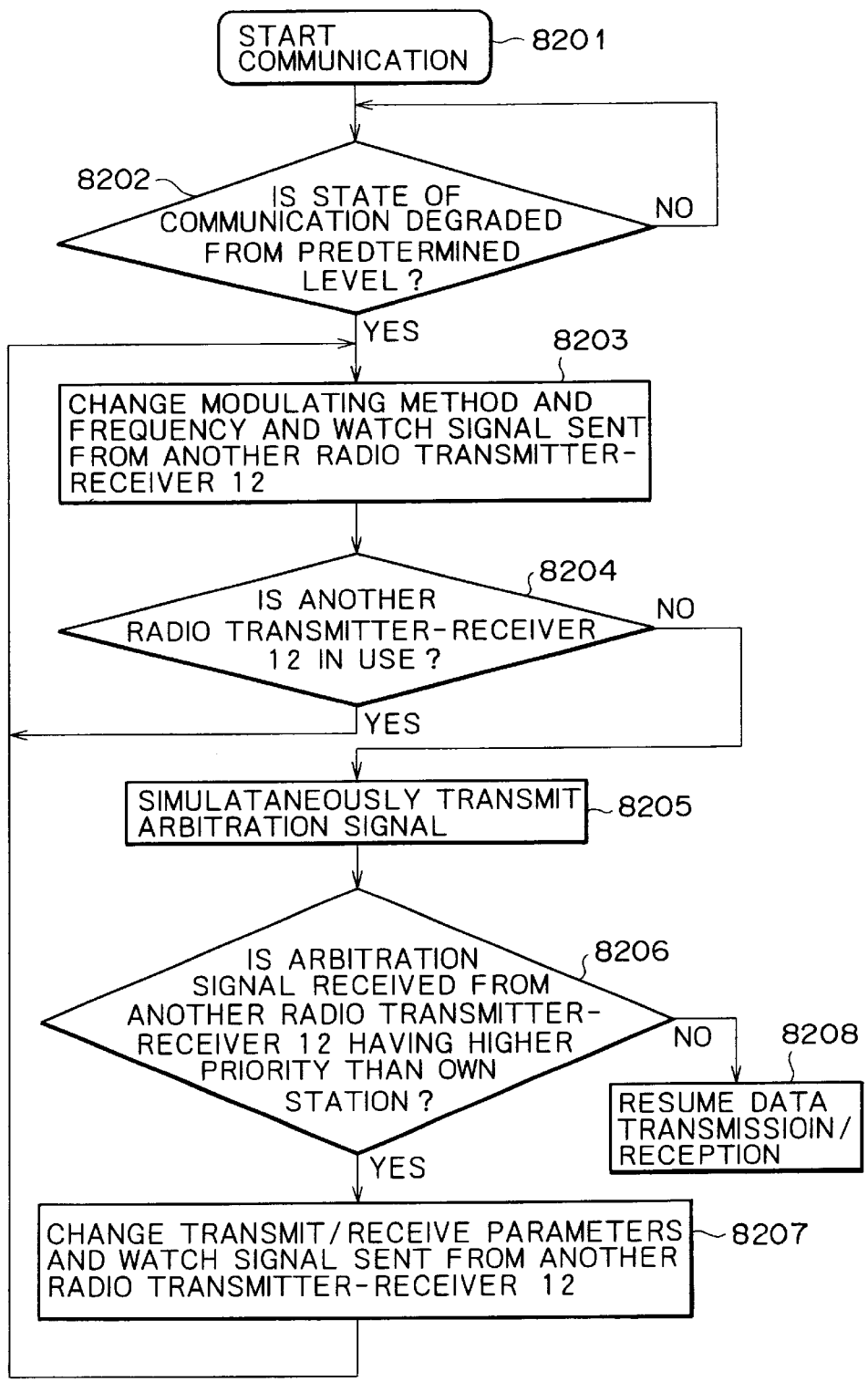
FIG. 17 is a flow chart for describing a procedure of processes executed by the transmitting/receiving method selecting device of the radio relay station according to the first embodiment of the present invention.

Namely, as shown in FIG. 17, when the transmitting/receiving method selecting device 13 of each radio relay station 1 collects an operating state of a network detected by the data relay determining device 11 and each radio transmitter-receiver 12, e.g., a bit error rate and a data disappearance rate, the number of data redeliveries, etc., stores them as status information, and determines, based on the stored contents that the operating state of the network is degraded as viewed from a predetermined level (procedural step 8202), the transmitting/receiving method selecting device 13 may change transmit parameters such as a modulating method and a frequency in a manner similar to the processing described in FIG. 6, set them to the data relay determining device 11 and each radio transmitter-receiver 12, and repeatedly notify them to each adjacent radio relay station 1 corresponding to a party to communicate with the corresponding radio transmitter-receiver (procedural step 8203) until the operating state of the network is recovered (procedural steps 8203 through 8208).

Figure 18:
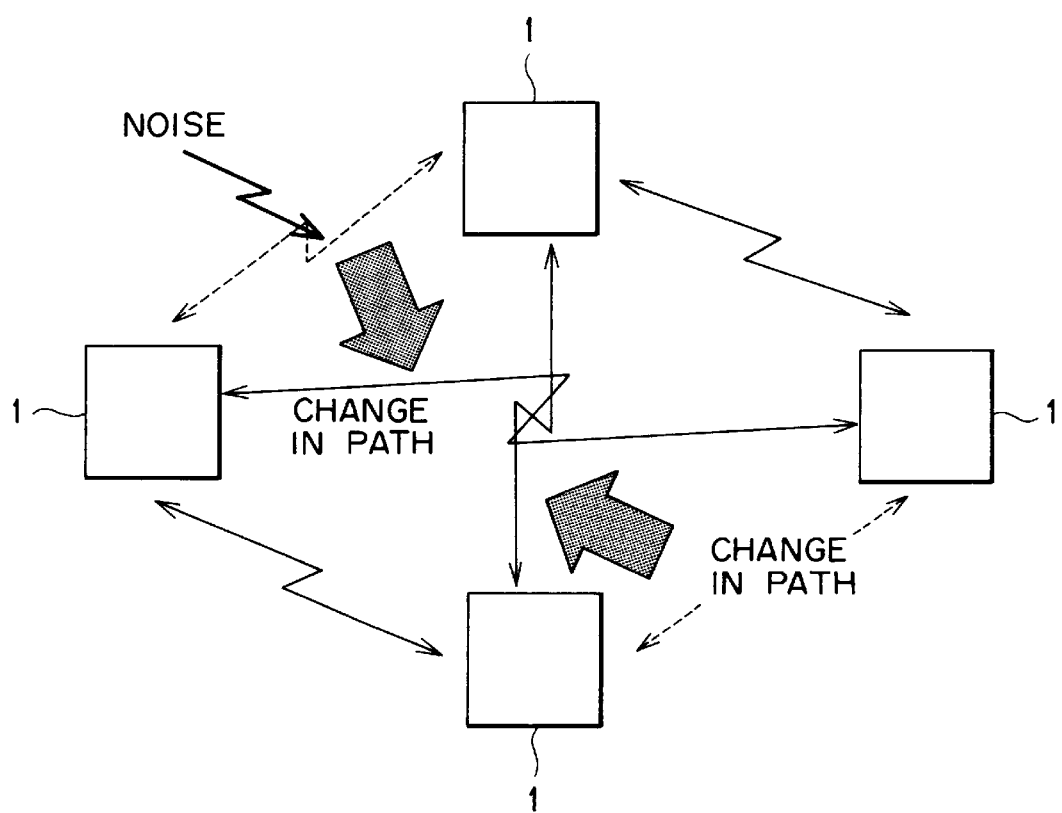
FIG. 18 is a diagram showing a modification of a ring-like transmission path form employed in the radio relay system according to the first embodiment of the present invention.

When failure points occur in plural form and such a circumstance that failures are unavoidable even by a failure avoidance configuration using a ring-like and bidirectional data transmission path, takes place in the above-described embodiment, a radio transmitter-receiver 12 corresponding to a party to communicate with each radio transmitter-receiver 12 is dynamically changed according to a suitable algorithm, and the connected form of the data transmission path is changed, as shown in FIG. 18, whereby a new ring-like transmission path in which radio relay stations 1 are different in connection order, may be formed.

Figure 19:
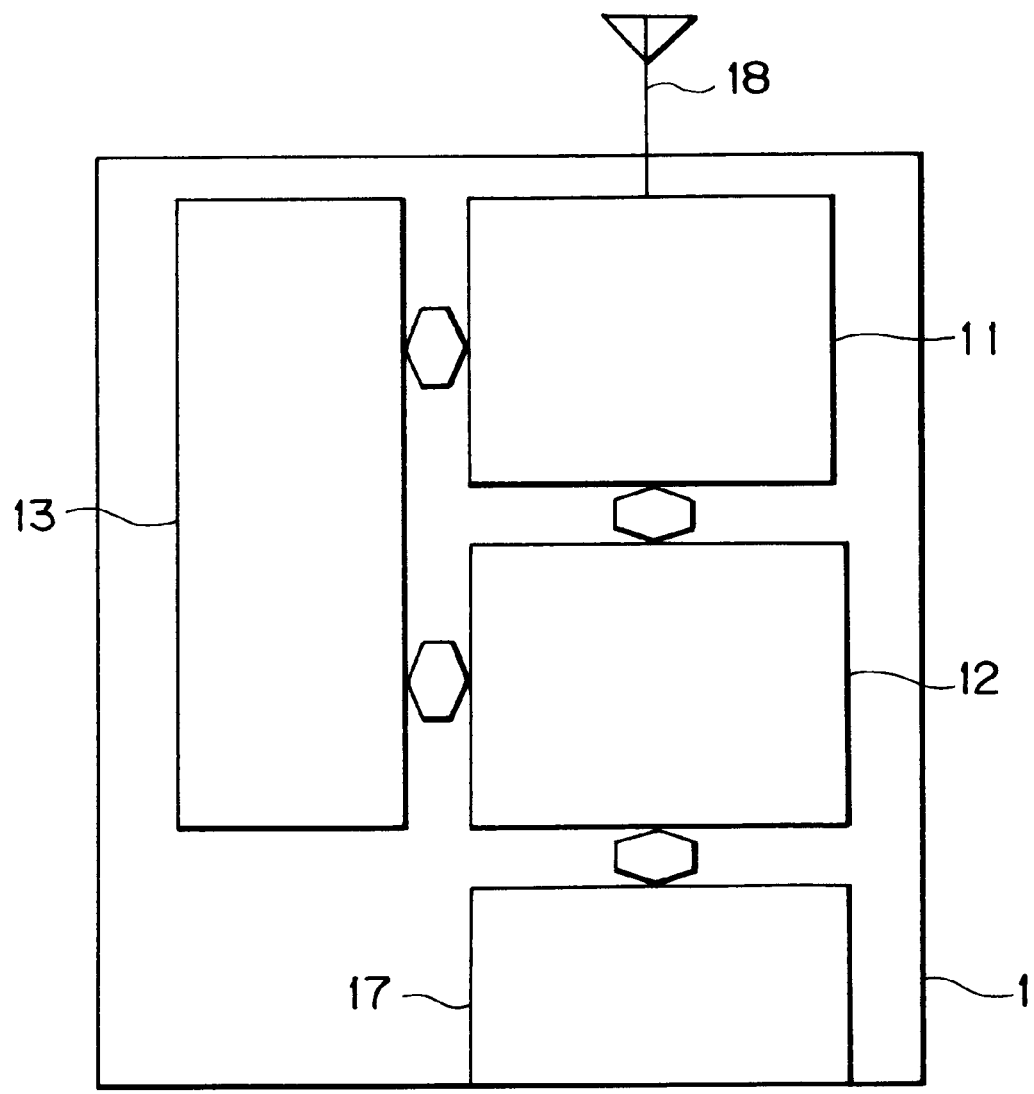
FIG. 19 is a block diagram illustrating another configurational example of the radio relay station according to the first embodiment of the present invention.

Further, the plurality of radio transmitter-receivers 12 are provided within one radio relay station 1 in the aforementioned embodiment. However, the functions of the plural radio transmitter-receivers 12 may be implemented by one radio transmitter-receiver 12 as shown in FIG. 19. In this case, the radio transmitter-receiver 12 changes a modulating method and frequency to be used according to each opposed adjacent radio relay station 1 each time it transmits and receives data to and from different adjacent radio relay stations 1. Owing to such a configuration, a demerit arises in that a processing load on a data relay determining device 11 increases, but a merit arises in that hardware can be simplified.

Figure 20:
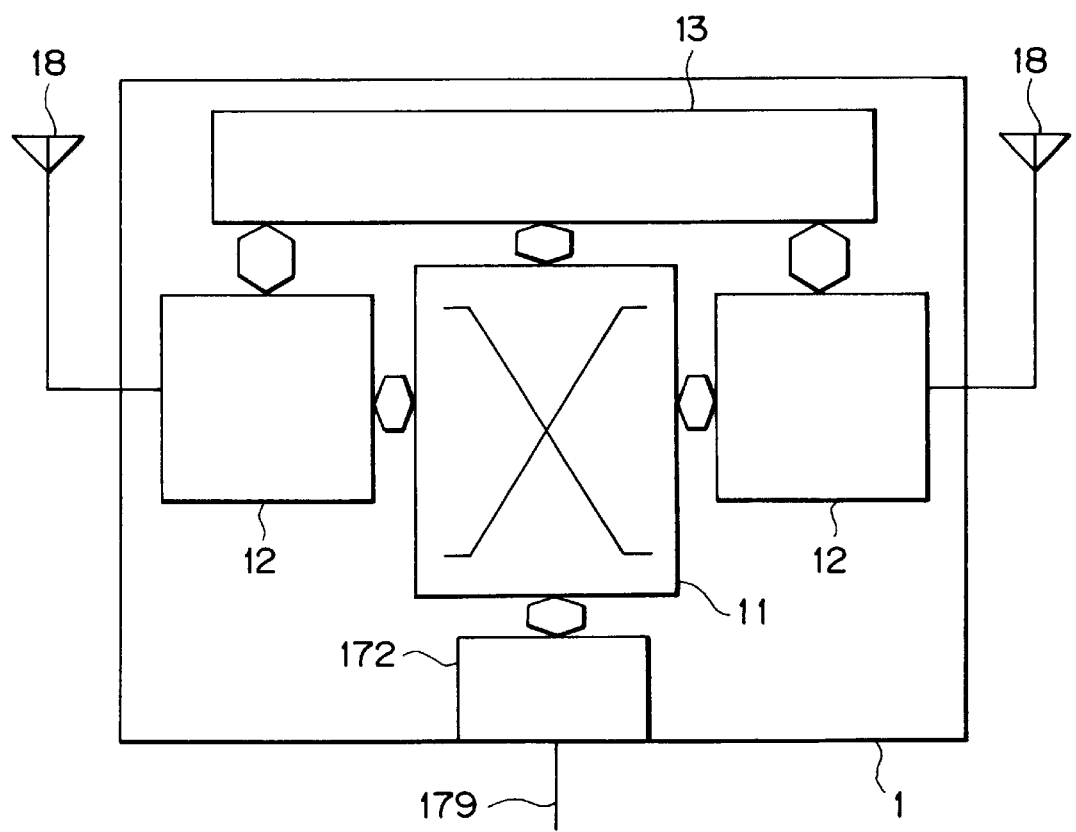
FIG. 20 is a block diagram depicting a further configurational example of the radio relay station according to the first embodiment of the present invention.
Figure 21:
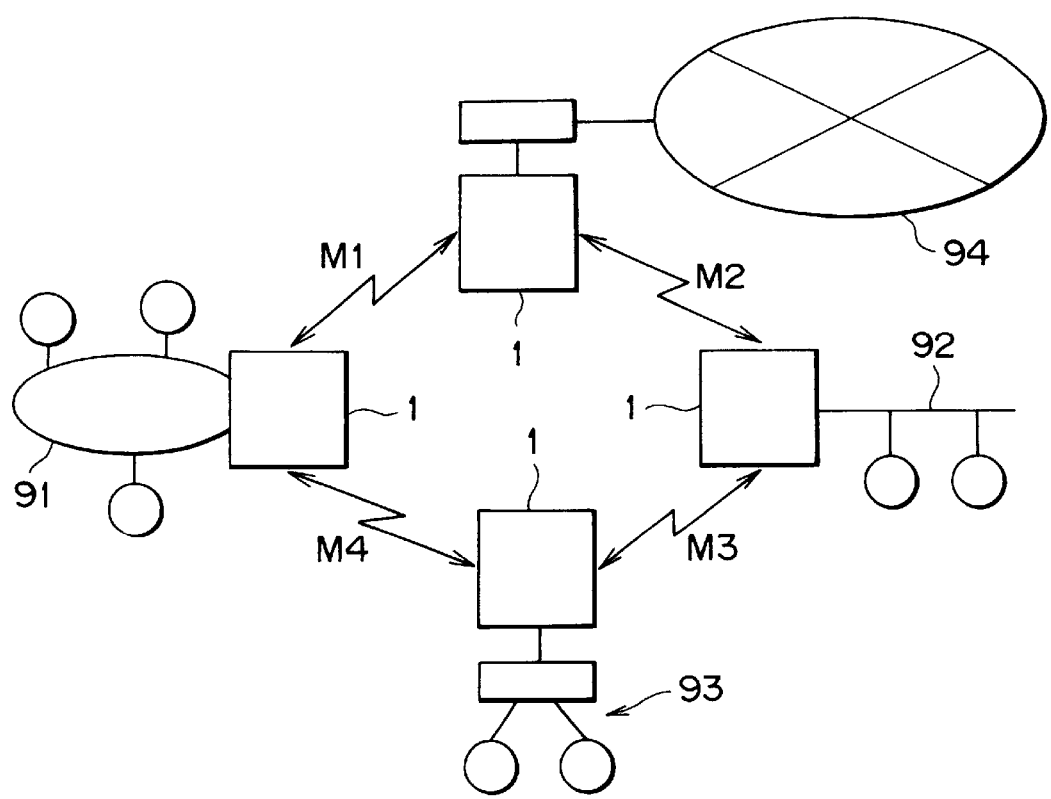
FIG. 21 is a block diagram showing another configurational example of the radio relay system according to the first embodiment of the present invention.

The above-described embodiment has described, as an example, the case where each individual radio relay stations 1 have held or accommodated the wireless LAN respectively. However, as shown in FIG. 20, a radio relay station 1 is provided with a network interface device 172 for performing communication processes of cable networks such as a LAN, a public network, etc., whereby each radio relay station 1 may be modified so as to hold the cable networks in place of the wireless LAN. In this case, the network interface device 172 and a wire transmission line or path 179 may be set as, for example, a 10BASE-T interface and a twist pair cable, or a modem and a public phone network line. Owing to such provision, such a communication system configuration as shown in FIG. 21, which performs a backbone function, can be constructed wherein radio transmission paths lying between respective radio relay stations 1 connect between wired LAN 91 to 93/WAN94.

Incidentally, the relay operation of the radio relay station 1 in the embodiment using the network interface device 172 is equivalent to a case in which in the aforementioned first embodiment, the network interface device 171 is replaced by the network interface device 172.

Figure 23:
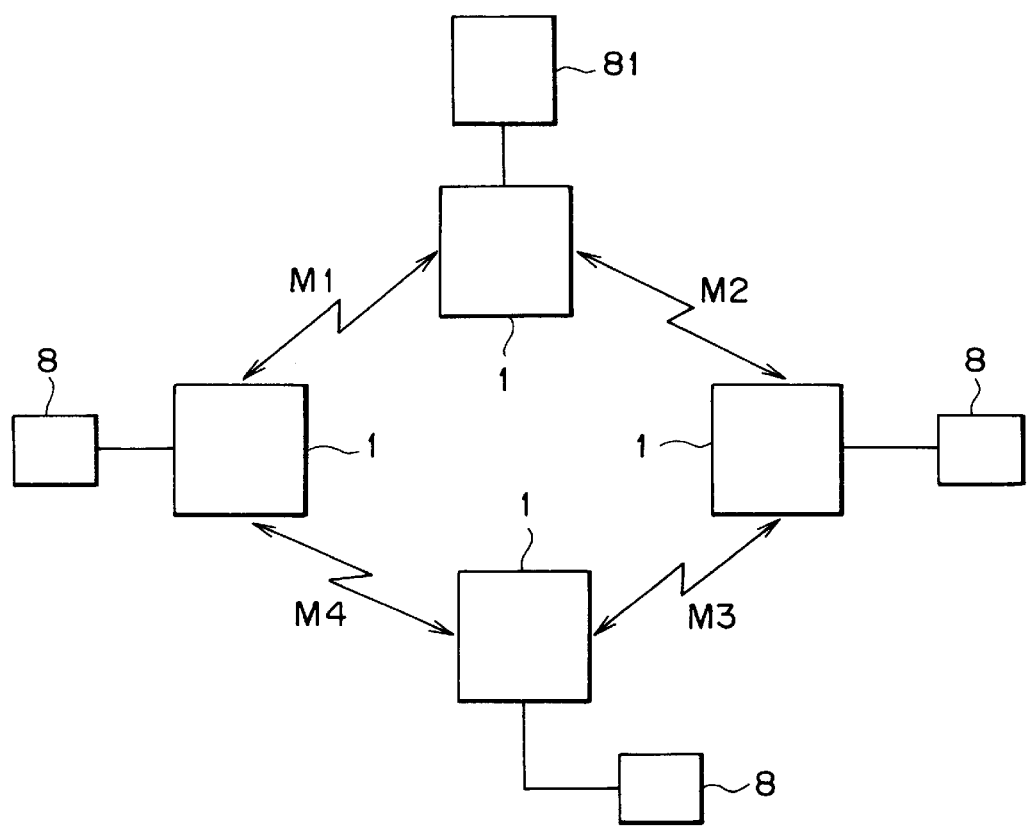
FIG. 23 is a block diagram depicting a further configurational example of the radio relay system according to the first embodiment of the present invention.

Further, in the above-described embodiment, each radio relay station 1 is provided with a network interface device 173 for performing the transfer of data between the same station and electronic equipment such as a camera, a monitor, etc., as shown in FIG. 22, whereby each radio relay station 1 may be modified so as to hold or accommodate the electronic equipment such as the camera, etc. in place of the wireless LAN. In this case, the data inputted and outputted between the respective electronic equipment is relayed between the radio relay stations 1. Namely, the network interface device 173 converts data outputted to its corresponding radio relay station 1 through a connecting cable 177 of electronic equipment to a format suitable for data transmission and relays it to its corresponding radio transmission paths through a data relay determining device 11, radio transmitter-receivers 12 and transmitting/receiving antennas 18. Further, the network interface device 173 converts data relayed from the corresponding radio transmission path to a data format processed by the electronic equipment and thereafter inputs it to the electronic equipment through the connecting cable 177. Owing to such a configuration, such a system as shown in FIG. 23 can be constructed wherein in each radio relay station 1, image data outputted from a camera 8 connected to its own radio relay station 1 is compressed and coded by a network interface device 173 and relayed to an image server 81 corresponding to a destination.

Figure 24:
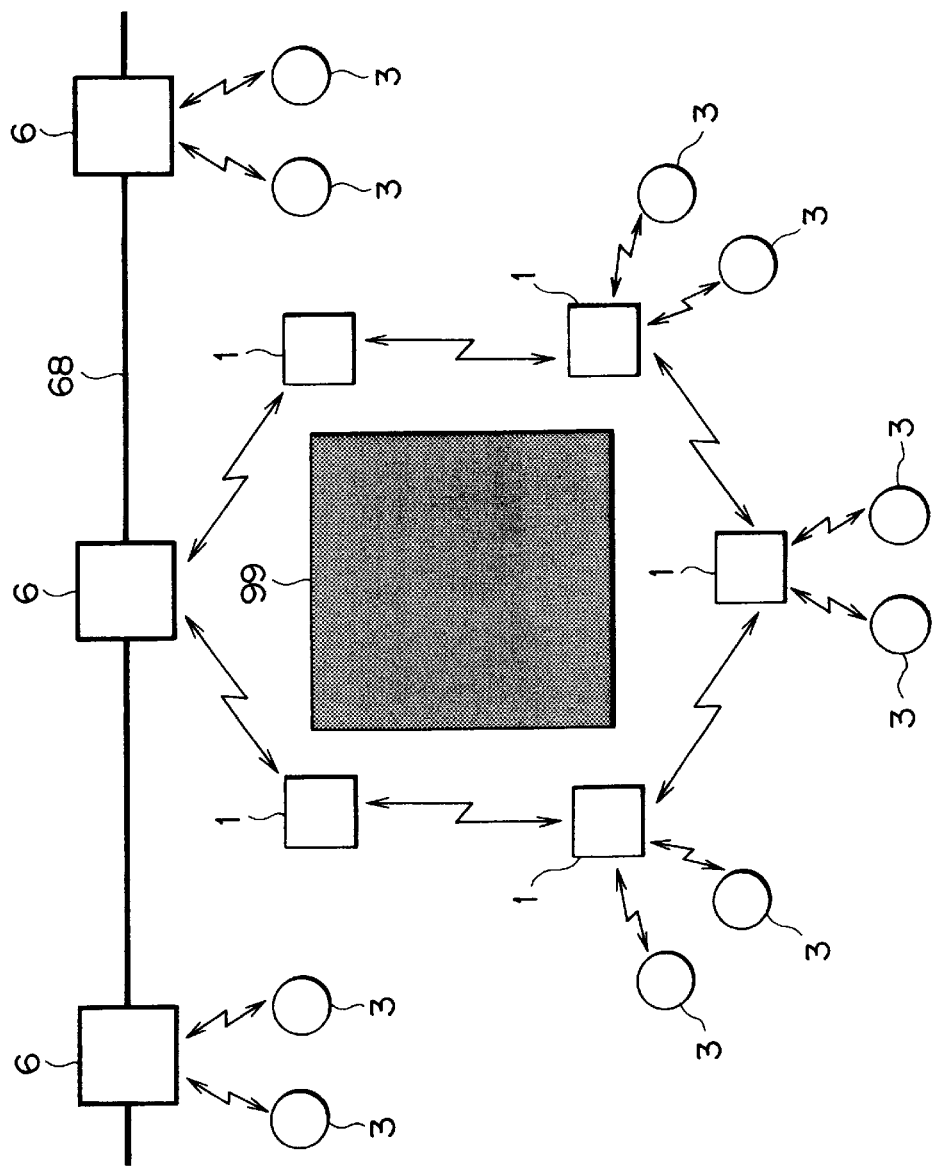
FIG. 24 is a block diagram showing a still further configurational example of the radio relay system according to the first embodiment of the present invention.

Further, the radio relay system according to the above embodiment may be configured so as to be applied to such a communication that as shown in FIG. 24, communication nodes 6 respectively transmit data through wired or wireless transmission lines or paths 68 and relay the data to their corresponding peripheral radio or wireless terminals 3 by radio. Namely, some of the communication nodes 6 may be used as the radio relay stations 1 of the present radio relay system. Owing to such a configuration, the data can be relayed by radio to radio terminals 3 which are located behind radiowave shielding objects such as a building, etc. and to which radio waves cannot be carried directly from the communication nodes 6.

Owing to the configuration of the radio relay station 1 according to the above embodiment so as to be capable of transmitting and receiving data to and from three or more other radio relay stations 1, a system can also be constructed in which a plurality of radio relay stations 1 are connected to one another by radio transmission paths shaped in mesh form as shown in FIG. 25. In this case, the transmission lines or paths provided in loop form are suitably set over mesh's volume lines.

For example, a plurality of radio relay stations 1 in a system wherein the plurality of radio relay stations 1 are connected to one another by mesh-like radio transmission paths, are divided into groups of the radio relay stations 1 which mutually perform data communications. Further, virtual ring transmission paths are formed between the radio relay stations 1 which belong to their corresponding groups. Such data transmission as shown in FIG. 7 is carried out every respective virtual ring transmission paths. It is essentially necessary to confirm the integrity of the mesh-like radio transmission paths between all the radio relay stations 1 and determine data relay paths every respective relay stations 1 on the basis of its result. If a failure occurs in any of the determined relay paths, it is then necessary to confirm the integrity of each transmission path between all the radio relay stations 1 again and re-determine each data relay path. Communications are discontinued during a period in which the relay paths are re-determined. According to the method shown in FIG. 25 on the other hand, the integrity of a necessary transmission path alone may be confirmed. Further, since the paths are always brought into double form between the corresponding radio relay station 1 and other radio relay stations 1 as shown in FIG. 7, a characteristic is brought about in that even if a failure occurs in one relay path, no communication interrupt takes place owing to data transmitted from the other relay path. On the other hand, when failures occur in both paths, the ring-like transmission paths may be reconstructed through the use of other sound or good mesh-like transmission paths.

Figure 26:
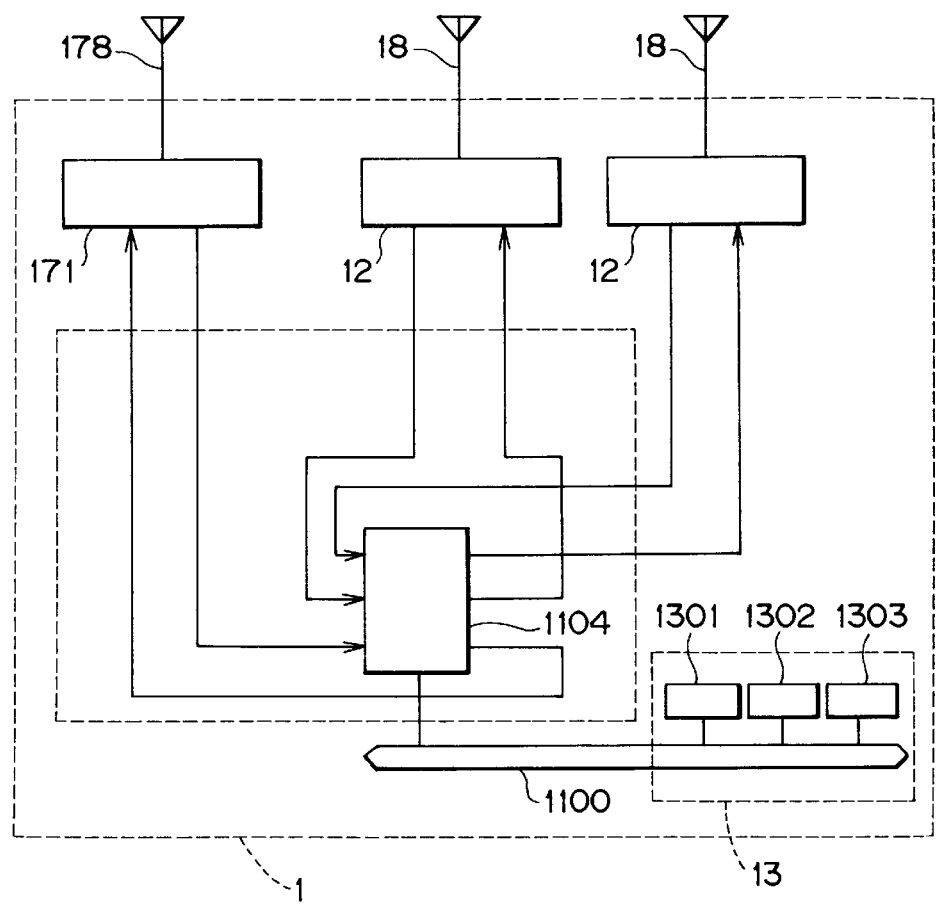
FIG. 26 is a block diagram depicting a still further hardware configurational example of the radio relay station according to the first embodiment of the present invention.
Figure 28:
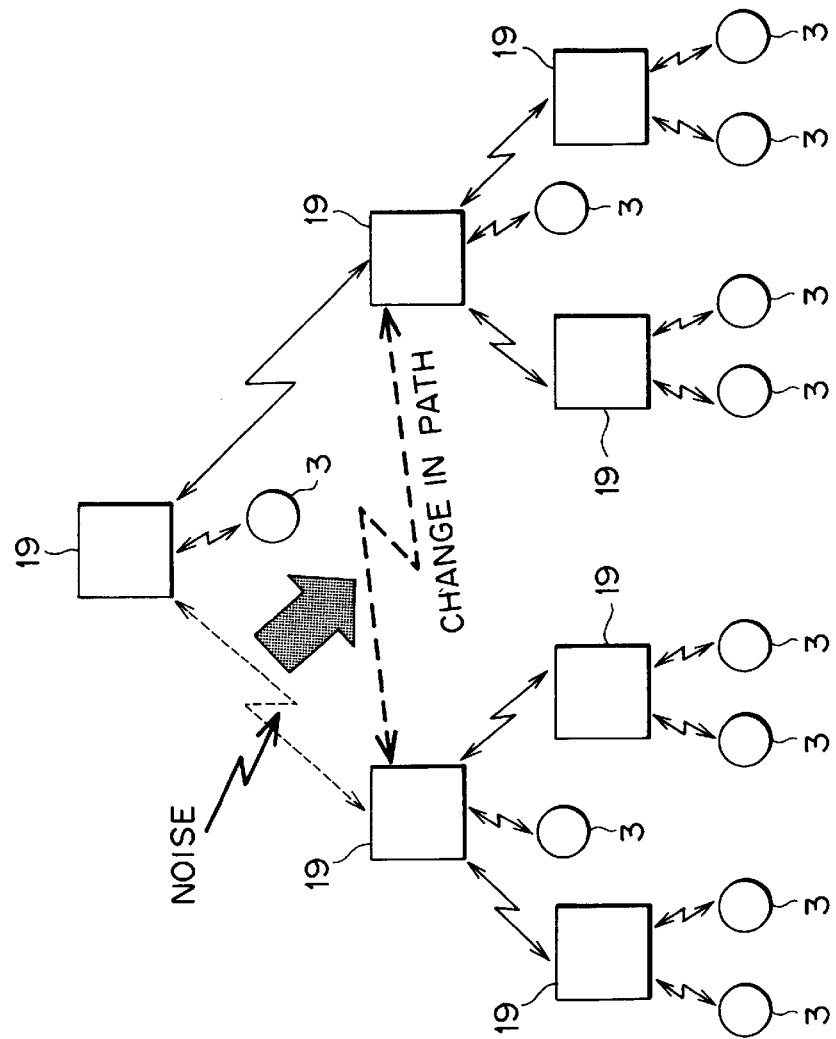
FIG. 28 is a diagram illustrating the manner in which a failure in the conventional radio relay system is avoided.
Figure 29:
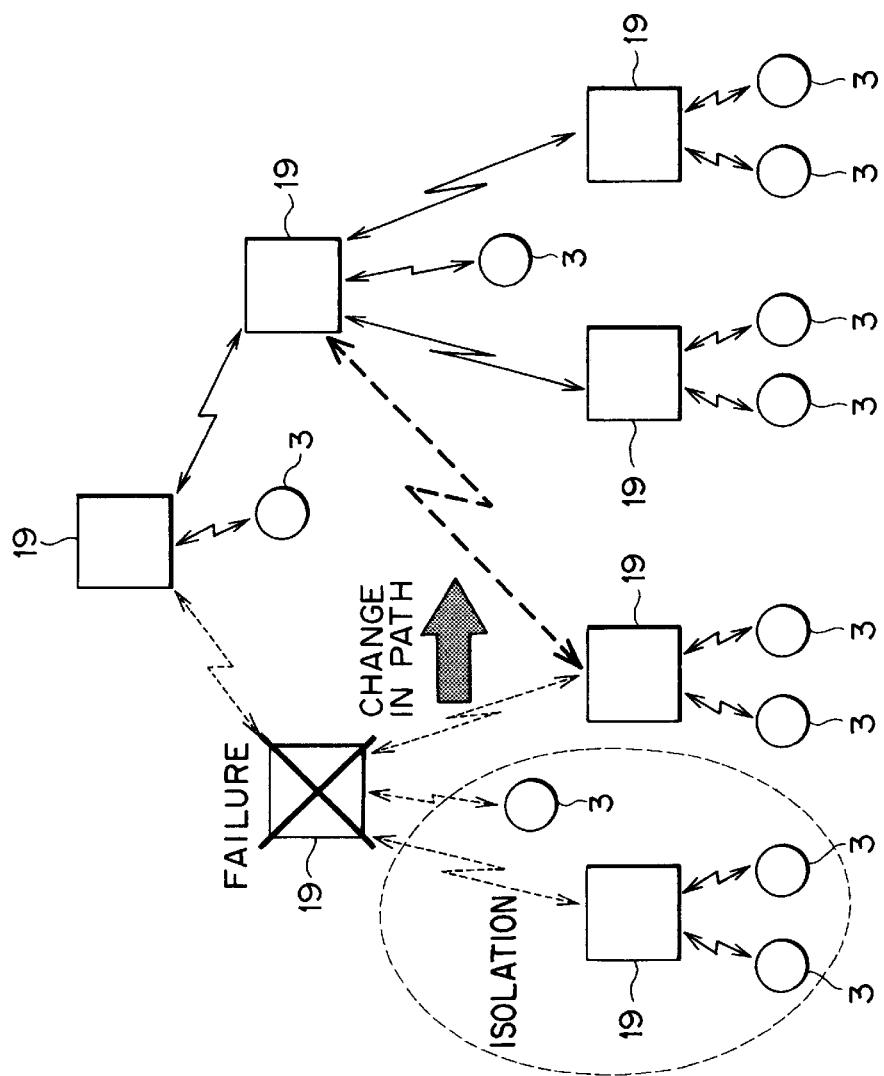
FIG. 29 is a diagram showing the manner in which a failure in the conventional radio relay system is avoided.

The functions executed by the CPU 1101, RAM 1102 and ROM 1103 previously shown in FIGS. 3, 4, 5, etc., i.e.., the discard determining function (procedural step 8030) and the routing process (procedural step 8040) may be performed by hardware (LSI) brought into LSI form as an exchange device 1104 shown in FIG. 26.

In this case, the exchange device 1104 effects a discard decision on data received from a network interface device 171 and each radio transmitter-receiver 12 according to the corresponding destination terminal number 9005 placed in transmission data 9000 or effects a determining process based on a relay table 9500 with output destinations incorporated therein, on it, and outputs the data to a network interface device 171 and a radio transmitter-receiver 12 each corresponding to the output destination.

According to the present embodiment as described above, each of the wireless or radio relay stations sets the data transmission paths in loop form and relays the data. Thus, no relay processing load is focused on one radio relay station. Further, when a transmission path failure occurs due to radio interference and equipment trouble, communications can be continued by a travelling direction unrouted through failure points. Accordingly, a radio relay system can be provided which is capable of relaying data with high performance and high reliability.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A radio relay system having a plurality of radio relay devices for performing the relay of communication data between communication devices by radio transmission, comprising:
    a plurality of radio transmission paths for ring-connecting said plurality of radio relay devices;
    said each radio relay device including,
        a local interface for holding one or plural communication devices;
        relay means for relaying communication data received from an immediately preceding radio transmission path on a ring, which is formed by the ring connection to an immediately following radio transmission path on the ring when the data is not destined for each communication device held by a corresponding radio relay device;
        receiving means for transmitting the communication data received from the on-ring immediately preceding radio transmission path to the corresponding communication device held through the local interface when the communication data is destined for the communication device held by said corresponding radio relay device; and
        transmitting means for transmitting communication data received from the communication device held through the local interface to the on-ring immediately following radio transmission path.

2. The radio relay system according to claim 1, wherein said plurality of radio transmission paths ring-connect said plurality of radio relay devices in double form so that the directions of data transmission are reversely turned relative to each other,
    said each radio relay device transmits the communication data received from the communication device held through the local interface to immediately following radio transmission paths on two rings formed by the double ring connection through the use of said transmitting means, and
    transmits only one communication data of the same communication data destined for the communication devices held by said corresponding radio relay device, said same communication data being received from the immediately preceding radio transmission paths on the two rings, to the communication device held through the local interface through the use of said receiving means.

3. The radio relay system according to claim 2, wherein said each radio relay device transmits only communication data received earlier on a time basis, of the same communication data destined for the communication devices held by said corresponding radio relay device, said same communication data being received from the immediately preceding radio transmission paths on the two rings, to the communication device held through the local interface through the use of said receiving means.

4. The radio relay system according to claim 1, 2 or 3, wherein said each radio relay device further includes determining means for determining a frequency-based resource or a time-based resource used in at least one of the on-ring immediately preceding radio transmission path and on-ring immediately following radio transmission path so as not to interfere with other radio transmission paths.

5. The radio relay system according to claim 1, wherein said plurality of radio transmission paths are capable of bidirectional communications,
    said each radio relay device allows said transmitting means to transmit communication data received from the communication device held through the local interface to respective radio transmission paths with respect to on-ring immediately following radio relay devices on both sides through the use of bidirectionally-communicable rings formed by the ring connection, and
    allows said receiving means to transmit only one of the same communication data destined for the communication devices held by said corresponding radio relay device, said same communication data being received from on-ring immediately preceding radio transmission paths present in respective directions on the rings, to the communication device held through the local interface.

6. The radio relay system according to claim 6, wherein said each radio relay device transmits only communication data received earlier on a time basis, of the same communication data destined for the communication device held by said corresponding radio relay device, said same communication data being received from the on-ring immediately preceding radio transmission paths present in the respective directions on the rings, to the communication device held through the local interface through the use of said receiving means.

7. The radio relay system according to claim 5, wherein said each radio relay device further includes determining means for determining a frequency-based resource or a time-based resource or coding of data or modulation of data used in at least one of the on-ring immediately preceding radio transmission path and the on-ring immediately following radio transmission path so as to differ from other radio transmission paths each other.

8. The radio relay system according to claim 1, further comprising:
    failure avoiding means for connecting said plurality of radio devices in ring form through the use of bidirectionally-communicable plural radio transmission paths and transmitting and receiving the communication data between arbitrary two radio devices through the use of one of bidirectionally-communicable rings formed by the ring connection.

9. The radio relay system according to claim 3, wherein said each radio relay device adds serial numbers to communication data relayed onto the two rings, and the corresponding radio relay device having received the communication data therein determines, based on the serial numbers whether said each communication data corresponds to communication data received earlier on a time basis.

10. The radio relay system according to claim 6, wherein said each radio relay device adds serial numbers to communication data relayed onto the rings, and the corresponding radio relay device having received the communication data therein determines, based on the serial numbers whether the communication data corresponds to communication data received earlier on a time basis.

11. A method of avoiding a failure developed in a radio relay system having a plurality of radio relay devices for performing the relay of communication data between communication devices by radio transmission, including:

a plurality of radio transmission paths for ring-connecting said plurality of radio relay devices;

said each radio relay device including, a local interface for holding one or plural communication devices;

relay means for relaying communication data received from an immediately preceding radio transmission path on a ring, which is formed by the ring connection to an immediately following radio transmission path on the ring when the data is not destined for each communication device held by a corresponding radio relay device;

receiving means for transmitting the communication data received from the on-ring immediately preceding radio transmission path to the corresponding communication device held through the local interface when the communication data is destined for the communication device held by said corresponding radio relay device; and transmitting means for transmitting communication data received from the communication device held through the local interface to the on-ring immediately following, comprising the steps of:

ring-connecting said plurality of radio relay devices in double form through the use of a plurality of radio transmission paths so that the directions of data transmission are reversely turned relative to each other;

transmitting and receiving the communication data between arbitrary two radio relay devices through the use of one of two rings formed by the double ring connection; and transmitting and receiving the communication data through the use of the other ring when a failure occurs in said one ring.

* * * * *